(12) United States Patent
Yao et al.

(10) Patent No.: US 12,363,252 B2
(45) Date of Patent: Jul. 15, 2025

(54) VIDEO TRANSFER CIRCUIT WITH MULTI-CHIP SYNCHRONIZATION CIRCUITRY

(71) Applicant: TEXAS INSTRUMENTS INCORPORATED, Dallas, TX (US)

(72) Inventors: Henry Yao, Santa Clara, CA (US); Anindita Borah, Santa Clara, CA (US); Vivek Gupta, San Jose, CA (US); Manikantan Jayaraman, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 192 days.

(21) Appl. No.: 18/176,306

(22) Filed: Feb. 28, 2023

(65) Prior Publication Data

US 2024/0291934 A1    Aug. 29, 2024

(51) Int. Cl.

| H04N 5/445 | (2011.01) |
| G06F 3/00 | (2006.01) |
| G06F 3/14 | (2006.01) |
| G06F 13/00 | (2006.01) |
| G09G 5/00 | (2006.01) |
| H04N 5/268 | (2006.01) |

(52) U.S. Cl.
CPC ........... *H04N 5/268* (2013.01); *G06F 3/1446* (2013.01); *G09G 5/006* (2013.01); *G09G 2370/14* (2013.01)

(58) Field of Classification Search
CPC ...... H04N 21/47; H04N 5/268; G06F 3/1446; G09G 5/006; G09G 2370/14
See application file for complete search history.

(56) References Cited

U.S. PATENT DOCUMENTS

| 6,473,476 | B1 * | 10/2002 | Banks | ........................ G06F 1/24 375/354 |
| 2004/0066870 | A1 * | 4/2004 | Gabara | ................. H03L 7/0814 375/354 |
| 2010/0302214 | A1 * | 12/2010 | Kim | ..................... H04N 13/398 345/204 |
| 2013/0155321 | A1 * | 6/2013 | Kuroki | ..................... H04N 5/04 348/501 |
| 2014/0002170 | A1 * | 1/2014 | Miyanishi | .............. H04N 1/047 327/299 |
| 2023/0194148 | A1 * | 6/2023 | Kempfle | ................ H04N 23/90 62/449 |

* cited by examiner

*Primary Examiner* — Gigi L Dubasky
(74) *Attorney, Agent, or Firm* — Mandy Barsilai Fernandez; Frank D. Cimino

(57) ABSTRACT

A video transfer circuit includes: a first communication interface; a second communication interface; and a digital timing generator having an input, an output, and a video timing signal interface. The input is coupled to the first communication interface. The video timing signal interface is coupled to the second communication interface. The digital timing generator is configured to: provide a first video timing signal to the second communication interface via the video timing signal interface responsive to a first mode selection; and receive a second video timing signal from the second communication interface via the video timing signal interface responsive to a second mode selection.

17 Claims, 9 Drawing Sheets

VIDEO TRANSFER CIRCUIT WITH MULTI-CHIP SYNCHRONIZATION CIRCUITRY

BACKGROUND

Low-Voltage Differential Signaling (LVDS) is a low-power and high-speed signaling standard often used to transfer video data. Open LVDS Display Interface (OLDI) is a related standard for data transfers between a video source and a display or graphics processor. Some displays have multiple segments, where each segment is to receive synchronized video data. Synchronizing video data for a multi-segment display or for multiple displays in a cost-effective way is an ongoing challenge.

SUMMARY

In an example, a video transfer circuit includes: a first communication interface; a second communication interface; and a digital timing generator having an input, an output, and a video timing signal interface. The input is coupled to the first communication interface. The video timing signal interface is coupled to the second communication interface. The digital timing generator is configured to: provide a first video timing signal to the second communication interface via the video timing signal interface responsive to a first mode selection; and receive a second video timing signal from the second communication interface via the video timing signal interface responsive to a second mode selection.

In another example, a de-serializer chip includes: a first communication interface; a second communication interface; a third communication interface; and control circuitry coupled to the first, second, and third communication interfaces. The control circuitry is configured to: receive a mode selection; obtain an input video stream via the first communication interface; perform multi-chip synchronization operations with another de-serializer chip via the second communication interface and based on the mode selection; and provide a first output video stream via the third communication interface responsive to the input video stream and the multi-chip synchronization operations. The first output video stream is synchronized with a second output video stream provided by the other de-serializer chip.

In yet another example, a video transfer circuit method includes: receiving a mode selection; obtaining an input video stream; performing multi-chip synchronization operations with another video transfer circuit based on the mode selection; and providing a first output video stream responsive to the input video stream and the multi-chip synchronization operations. The first output video stream is synchronized with a second output video stream provided by the other video transfer circuit.

DETAILED DESCRIPTION

Figure 1:
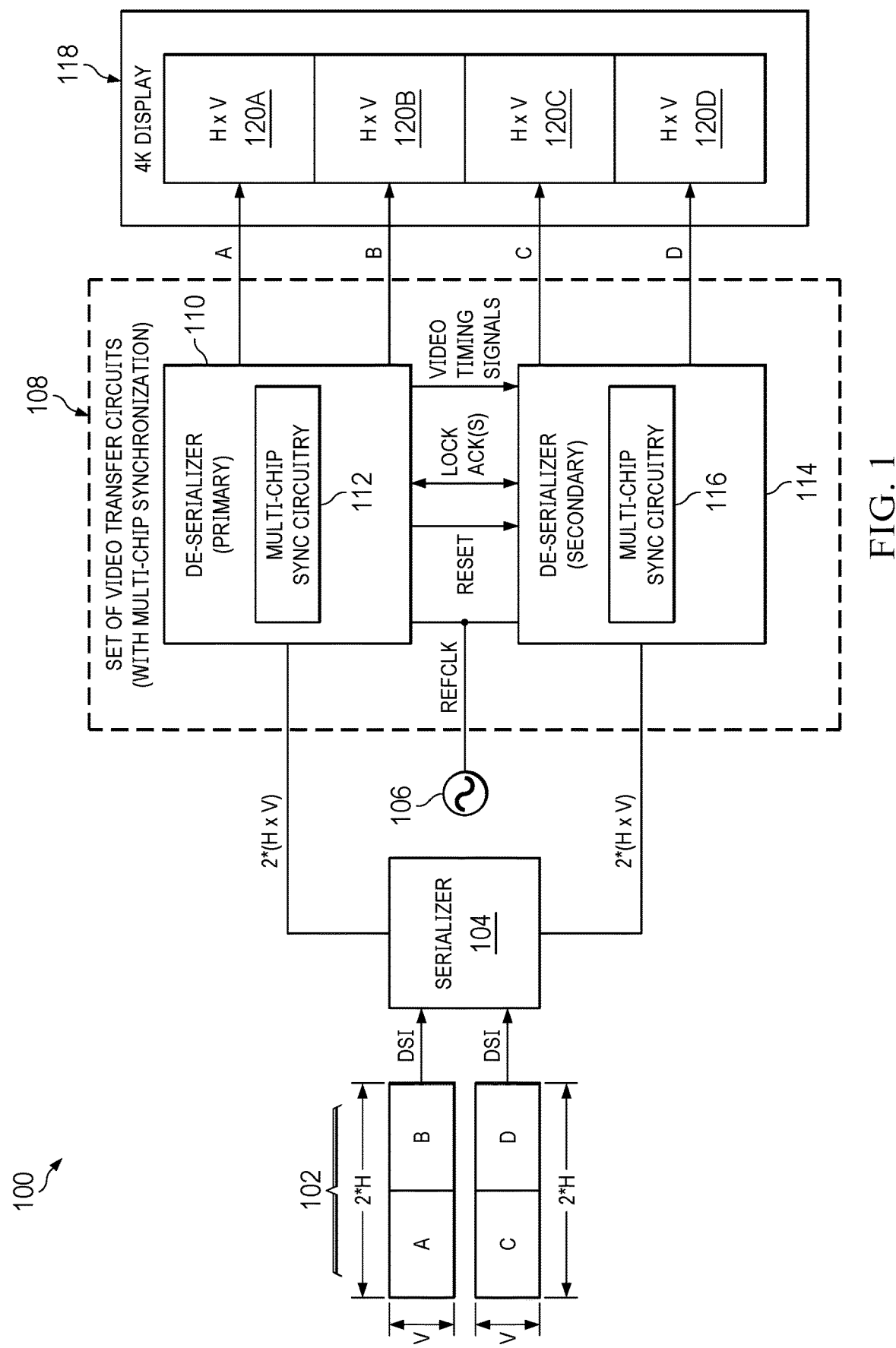
FIG. 1 is a block diagram showing an example system.

The same reference numbers or other reference designators are used in the drawings to designate the same or similar features. Such features may be the same or similar either by function and/or structure.

The described examples use multiple video transfer circuits to provide synchronized output video streams to multiple displays or multiple sections of a display. Without limitation, the video transfer circuits may use, for example, Low-Voltage Differential Signaling (LVDS) and Open LVDS Display Interface (OLDI) to transfer the output video streams to multiple displays or multiple sections of a display. Each video transfer circuit may provide one or more output video streams. Without limitation, each video transfer circuit may be an integrated circuit (IC) or chip. In some examples, each video transfer circuit includes multi-chip synchronization circuitry that operates to: 1) program available general programmable input/outputs (GPIOs) to send or receive a communication channel lock acknowledgement and/or a delay-locked loop (DLL) lock acknowledgement; 2) process a received communication channel lock acknowledgement and/or a received DLL lock acknowledgement as part of synchronization; 3) re-program at least one GPIO; 4) send or receive video timing signals responsive to the processed acknowledgements, re-programmed GPIO(s), and/or a mode signal that indicates whether the video transfer circuit is being used as a primary video transfer circuit or a secondary video transfer circuit; 5) send or receive a reset signal responsive to the processed acknowledgements and/or the mode signal; and/or 6) align its respective pixel clock (P_CLK) relative to a target to reduce sensitivity to process, voltage, and temperature (PVT) variance and circuitry delay variance. In some examples, a video transfer circuit operating as a primary video transfer circuit sends the video timing signals and a reset signal to another video transfer circuit operating as a secondary video transfer circuit. Each video transfer circuit may independently calibrate their respective P_CLK relative to a target. In some examples, the mode signal is stored in an available register for each video transfer circuit. In some examples, the multi-chip synchronization circuitry of each video transfer circuit performs synchronization operations during power up of the video transfer circuits or a related system.

In some examples, the multi-chip synchronization circuitry of each video transfer circuit includes, for example, multiplexers and programmable delay circuitry. In some examples, the multiplexers are used to select: 1) local video timing signals or shared video timing signals responsive to the mode signal; 2) a local reset signal or a shared reset signal responsive to the mode signal. The programmable delay circuitry is used to: 1) adjust the latency of when the video timing signals are used; 2) adjust the latency of when the reset signal is used; and/or 3) adjust P_CLK alignment.

In some examples, each video transfer circuit is a de-serializer. In such examples, multiple de-serializers receive the same source video data and the same REFCLK. Because the received source video data is asynchronous to the operations of each de-serializer, video blanking periods may be increased or decreased as needed by each video transfer circuit to maintain the same frame rate. The addition and subtraction of video blanking periods by each video transfer circuit increases the likelihood that their output video streams will not be synchronized. In some examples, a primary video transfer circuit continuously shares video timing signals to one or more secondary video transfer circuits to reduce or eliminate variance in the video blanking periods. In some examples, the video timing signals include a horizontal sync (HS) signal, a vertical sync (VS) signal, and the data enable (DE) signal. In some examples, two video transfer circuits emulate a single quad OLDI interface.

FIG. 1 is a block diagram showing an example system 100. The system 100 includes a video source 102, a serializer 104, an oscillator 106, a set of video transfer circuits 108, and a display 118. The set of video transfer circuits 108 includes a first de-serializer 110 and a second de-serializer 114. The first and second de-serializers 110 and 114 are examples of the video transfer circuits described herein. The first de-serializer 110 includes multi-chip synchronization circuitry 112. The second de-serializer 114 includes multi-chip synchronization circuitry 116. In some examples, the first de-serializer 110 operates a primary de-serializer, while the second de-serializer 114 operates a secondary de-serializer. As shown, the display 118 includes four sections 120A, 120B, 120C, and 120D. Each of the sections 120A, 120B, 120C, and 120D has a horizontal (H) range and a vertical (V) range. For example, the H and V ranges may be given in pixels.

The video source 102 provides video including video portions A, B, C, and D. In some examples, the video source 102 is a camera. In other examples, the video source 102 is a graphics processing unit (GPU). Each of the video portions A, B, C, and D has an H portion and a V portion. In the example of FIG. 1, the video portions A and B are transmitted from the video source 102 to a serializer 104 via a first display serial interface (DSI). The video portions C and D are transmitted from the video source 102 to the serializer 104 via a second DSI. The serializer 104 outputs video portions A and B in a serialized format labeled 2*(H×V). The serializer 104 also outputs video portions C and D in a serialized format labeled 2*(H×V). In other examples, the serializer 104 may output video portions A and B in a serialized format 2*H×V, and may output video portions C and D in a serialized format 2*H×V. In some examples, one or more cables are used to transfer the video portions A, B, C, and D to the set of video transfer circuits 108 or a related printed circuit board (PCB).

The first de-serializer 110 operates to: receive the video portions A and B in the serialized format from the serializer 104; receive REFCLK from the oscillator 106; generate a unit interval clock signal (UI_CLK) for the first de-serializer 110 responsive to REFCLK; generate a pixel clock signal (P_CLK) responsive to UI_CLK; perform de-serialization operations on the video portions A and B; perform multi-chip synchronization operations; and provide output video steams to the display 118 responsive to P_CLK, video portions A and B, the de-serialization operations, and the multi-chip synchronization operations. The second de-serializer 114 operates to: receive the video portions C and D in the serialized format from the serializer 104; receive REFCLK from the oscillator 106; generate UI_CLK responsive to REFCLK; generate a P_CLK responsive to UI_CLK; perform de-serialization operations on the video portions C and D; perform multi-chip synchronization operations; and provide output video steams to the display 118 responsive to P_CLK, video portions C and D, the de-serialization operations, and the multi-chip synchronization operations.

In some examples, the multi-chip synchronization operations performed by the multi-chip synchronization circuitry 112 and/or the multi-chip synchronization circuitry 116 include: 1) program available GPIOs to send or receive a communication channel lock acknowledgement and/or a DLL lock acknowledgement; 2) process a received communication channel lock acknowledgement and/or a received DLL lock acknowledgement as part of synchronization; 3) re-program at least one GPIO; 4) send or receive video timing signals (e.g., VS, HS, and DE) responsive to the processed acknowledgements, re-programmed GPIO(s), and/or a mode signal; and 5) sending or receiving a reset signal responsive to the processed acknowledgements, re-programmed GPIO(s), and/or the mode signal; and/or 6) aligning their respective P_CLKs to within a target tolerance (e.g., one-half of a UI_CLK period).

In the example of FIG. 1, available channels and related GPIOs of the first de-serializer 110 and the second de-serializer 114 are used for synchronization operations. As needed, the available channels and related GPIOs, are programed or re-programmed to send or receive signals related to synchronization. Example synchronization signals include a communication link lock acknowledgement, a DLL lock acknowledgement, video timing signals (e.g., VS, HS, DE), and/or a reset signal.

In some examples, the first de-serializer 110 operates as a primary video transfer circuit or operates in a primary video transfer circuit mode. Meanwhile, the second de-serializer 114 operates as a secondary video transfer circuit or operates in a secondary video transfer circuit mode. In such examples, the multi-chip synchronization circuitry 112 of the first de-serializer 110 may operate to send video timing signals and a reset signal to the second de-serializer 114. Meanwhile, the multi-chip synchronization circuitry 116 of the second de-serializer 114 may operate to receive the video timing signals and the reset signal. The output video streams of the first de-serializer 110 and the second de-serializer 114 are synchronized responsive to the shared video timing signals and the shared reset signal.

In some examples, the multi-chip synchronization circuitry 112 of the first de-serializer 110 and/or the multi-chip synchronization circuitry 116 of the second de-serializer 114 includes programmable delay lines. The programmable delay lines may be used to delay the video timing signals, the reset signal, and/or P_CLK generation to improve synchronization. In some examples, the multi-chip synchronization circuitry 112 of the first de-serializer 110 and/or the multi-chip synchronization circuitry 116 of the second de-serializer 114 includes multiplexers. The multiplexers operate to select between local sync signals (e.g., video timing signals and/or a reset signal) or shared sync signals from a primary video transfer circuit. In some examples, the multi-chip synchronization circuitry 112 of the first de-serializer 110 and/or the multi-chip synchronization circuitry 116 of the second de-serializer 114 performs synchronization operations during power up of the first and second de-serializers 110 and 114. To synchronize the outputs video streams of the first and second de-serializers 110 and 114, a target uncertainty of 3.5 UI_CLK periods may be used.

In some examples, the first and second de-serializers 110 and 114 receive the same source data and the same REFCLK. However, the received video is asynchronous to the operations of each of the first and second de-serializers 110 and 114. In order to maintain the same frame rate, video blanking periods are increased and decreased as needed by each of the first and second de-serializers 110 and 114. The addition and subtraction of video blanking periods by the first and second de-serializers 110 and 114 increases the likelihood that the video output streams will not be synchronized. In some examples, the first de-serializer 110 continuously sends video timing signals to the second de-serializer 114 to account for variance in the video blanking periods. In some examples, the video timing signals include VS, HS, and DE. In some examples, the first and second de-serializers 110 and 114 emulate a single quad OLDI interface.

In some examples, the first and second de-serializers 110 and 114 are flat panel display (FPD) link de-serializers such as FPD-Link III de-serializers. In such examples, the first and second de-serializers 110 and 114 may be used with serializers to convert 1-lane or 2-lane FPD-Link streams into an FPD-Link interface such as an OLDI interface. In such examples, communication channel lock acknowledgements sent and received as part of multi-chip synchronization are FPD-link lock acknowledgements. Also, DLL lock acknowledgements sent and received as part of multi-chip synchronization are OLDI DLL lock acknowledgements. In some examples, the first and second de-serializers 110 and 114 recover the data from one or two FPD-Link serial streams and translate the recovered data into dual pixel FPD-link data (e.g., 8 LVDS data lanes+clock) supporting video resolutions up to 2K with 24-bit color depth. In such examples, the first and second de-serializers 110 and 114 provide a bridge between high-definition multimedia interface (HDMI) enabled sources and LDVS displays or application processors. In some examples, the HDMI sources include cameras and/or GPUs. Such FPD-Link III interfaces support video and audio data transmission as well as full duplex control over the same differential link. In some examples, full duplex control includes inter-integrated circuit (I2C) and serial peripheral interface (SPI). In some examples, each of the first and second de-serializers 110 and 114 automatically senses FPD-Link channels and supplies clock alignment and de-skew functionality without previous training.

Figure 2:
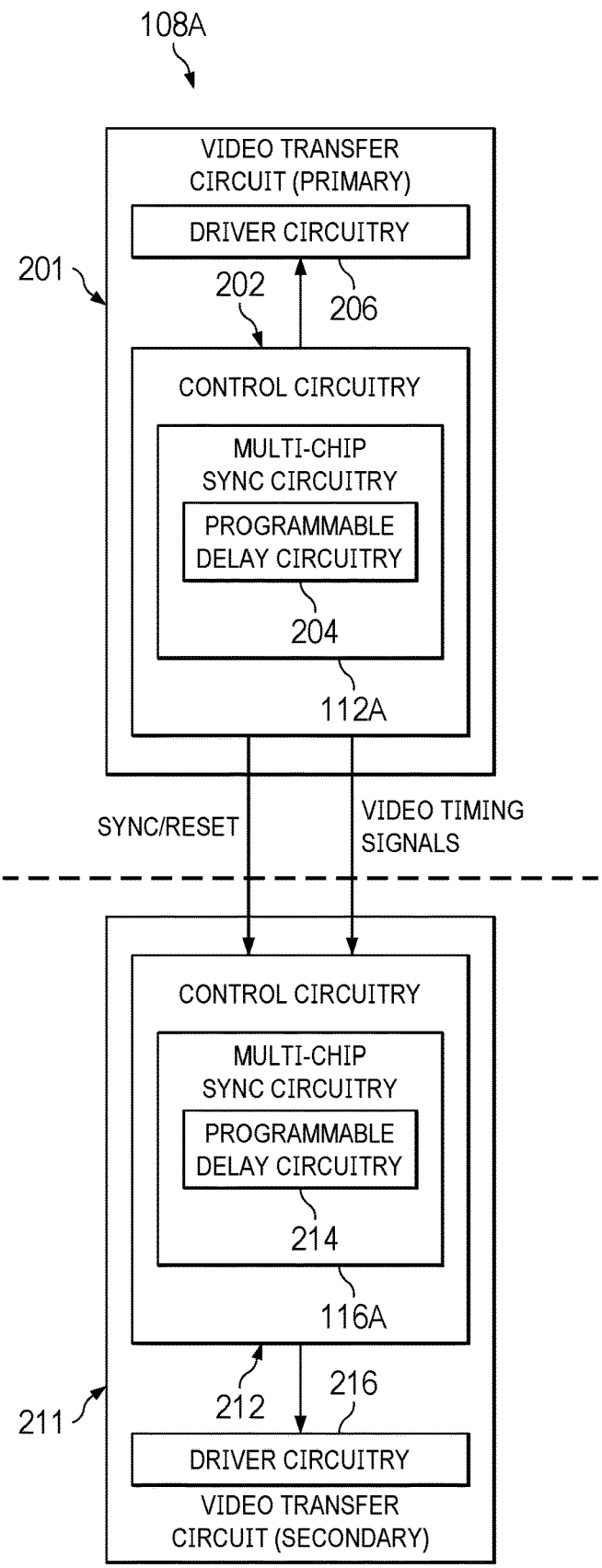
FIG. 2 is a block diagram showing an example set of video transfer circuits.

FIG. 2 is a block diagram showing an example set of video transfer circuits 108A. The set of video transfer circuits 108A includes a first video transfer circuit 201 and a second video transfer circuit 211. Without limitation, the first video transfer circuit 201 may be a de-serializer such as first de-serializer 110 in FIG. 1. Also, the second video transfer circuit 211 may be a de-serializer such as second de-serializer 114 in FIG. 1. The first video transfer circuit 201 includes control circuitry 202 and driver circuitry 206. The control circuitry 202 includes multi-chip synchronization circuitry 112A. The multi-chip synchronization circuitry 112A is an example of the multi-chip synchronization circuitry 112 in FIG. 1 and may perform multi-chip synchronization operations such as those described for FIG. 1. In the example of FIG. 2, the multi-chip synchronization circuitry 112A includes programmable delay circuitry 204 to perform at least some of the multi-chip synchronization operations of the first video transfer circuit 201. The multi-chip synchronization circuitry 112A may also include multiplexers (not shown) to select between local sync signals or shared sync signals responsive to a mode selection.

The second video transfer circuit 211 includes control circuitry 212 and driver circuitry 206. The control circuitry 212 includes multi-chip synchronization circuitry 116A. The multi-chip synchronization circuitry 116A is an example of the multi-chip synchronization circuitry 116 in FIG. 1 and may perform multi-chip synchronization operations such as those described for FIG. 1. In the example of FIG. 2, the multi-chip synchronization circuitry 116A includes programmable delay circuitry 214 to perform at least some of the multi-chip synchronization operations of the second video transfer circuit 211. The multi-chip synchronization circuitry 112A may also include multiplexers (not shown) to select between local sync signals or shared sync signals responsive to a mode selection.

Without limitation, the multi-chip synchronization operations performed by the first video transfer circuit 201 and/or the second video transfer circuit 211 may include: sharing video timing signals from a primary video transfer circuit to a secondary video transfer circuit; sharing a reset signal from a primary video transfer circuit to a secondary video transfer circuit; aligning P_CLK relative to a target; delaying propagation of local or shared video timing signals within one or more of the video transfer circuits; and/or delaying propagation of a local or shared reset signal within one or more of the video transfer circuits.

Figure 3:
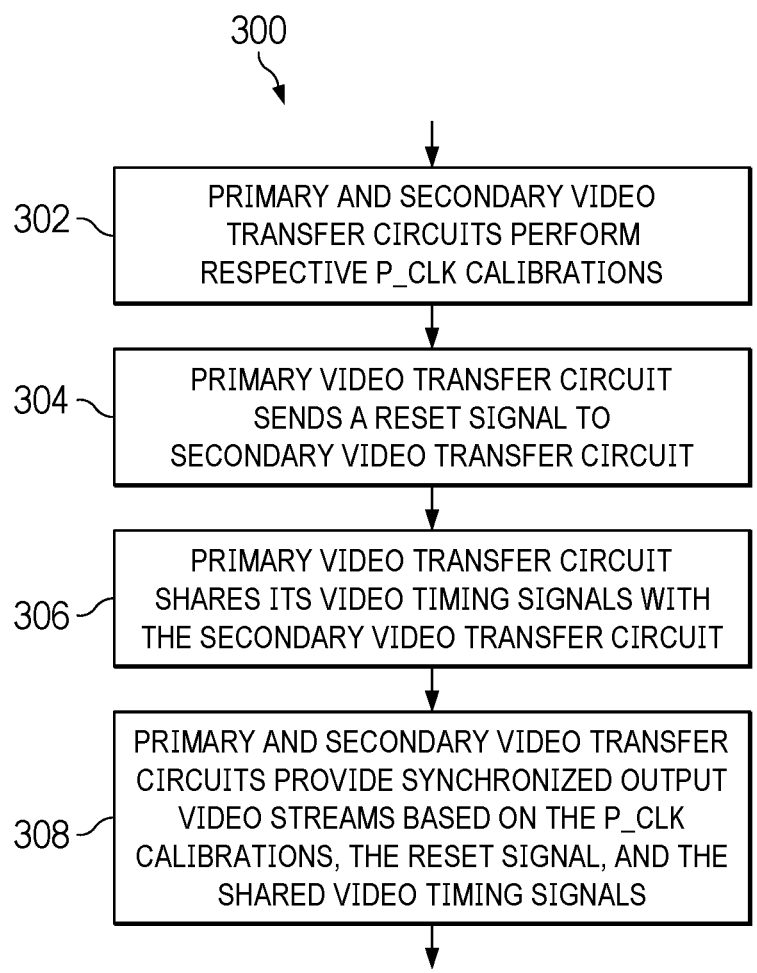
FIG. 3 is a flowchart showing an example method to synchronize multiple video transfer circuits.

FIG. 3 is a flowchart showing an example method 300 to synchronize multiple video transfer circuits. As shown, the method 300 includes primary and secondary video transfer circuits performing respective P_CLK calibrations at block 302. In some examples, the P_CLK calibrations achieve multi-chip P_CLK alignment by adjusting the latency of generating UI_CLK from REFCLK and/or adjusting the phase of UI_CLK to account for PVT variance and circuitry delay variance. In some examples, some of the P_CLK calibrations are performed once by a test interface, while other P_CLK calibrations are performed in real-time. For example, a one-time P_CLK calibration may account for circuitry delay variance, while real-time P_CLK calibration accounts for voltage and temperature variance over time. At block 304, the primary video transfer circuit sends a reset signal to the secondary video transfer circuit. At block 306, the primary video transfer circuit shares its video timing signals with the secondary video transfer circuit. At block 308, the primary and secondary video transfer circuits provide synchronized output video streams based on the P_CLK calibrations, the shared reset signal, and the shared video timing signals. In some examples, blocks 302 and 304 are optional. In some examples, programmable delay lines are used to adjust delay of P_CLK generation, reset signal propagation, and/or video timing signal propagation for one or more of the video transfer circuits of method 300.

In some examples, a video transfer circuit method such as the method 300 includes: receiving a mode selection; obtaining an input video stream; performing multi-chip synchronization operations with another video transfer circuit based on the mode selection; and providing a first output video stream responsive to the input video stream and the multi-chip synchronization operations, the first output video stream synchronized with a second output video stream provided by the other video transfer circuit.

In some examples, performing the multi-chip synchronization operations includes sending or receiving shared video timing signals responsive to the mode selection. In some examples, performing the multi-chip synchronization operations includes: programming GPIOs to send and receive a communication link lock acknowledgement and a DLL lock acknowledgment; after sending and receiving the communication link lock acknowledgement and the DLL lock acknowledgment, re-programming one of the programmed GPIOs; and sharing the video timing signals via GPIOs including the re-programmed GPIO. In some examples, performing the multi-chip synchronization operations includes: sending or receiving a reset signal responsive to the mode selection; delaying the reset signal; and using the delayed reset signal to provide the first output video stream.

In some examples, performing the multi-chip synchronization operations includes: obtaining video timing signals from the other video transfer circuit responsive to the mode selection indicating a secondary video transfer circuit mode; and using the video timing signals to provide the first output video stream. In some examples, the multi-chip synchronization operations include: programming GPIOs related to the second communication interface to send and receive a communication link lock acknowledgement and a DLL lock acknowledgment; after sending and receiving the communication link lock acknowledgement and a DLL lock acknowledgment, re-programming one of the programmed GPIOs; and obtaining the video timing signals via GPIOs related to the second communication interface including the re-programmed GPIO.

In some examples, performing the multi-chip synchronization operations includes: sending a reset signal to the other video transfer circuit responsive to the mode selection indicating a primary video transfer circuit mode; delaying the reset signal locally; and using the delayed reset signal to provide the first output video stream. In some examples, performing the multi-chip synchronization operations includes: receiving a reset signal from the other video transfer circuit responsive to the mode selection indicating a secondary video transfer circuit mode; and using the received reset signal to provide the first output video stream.

Figure 4:
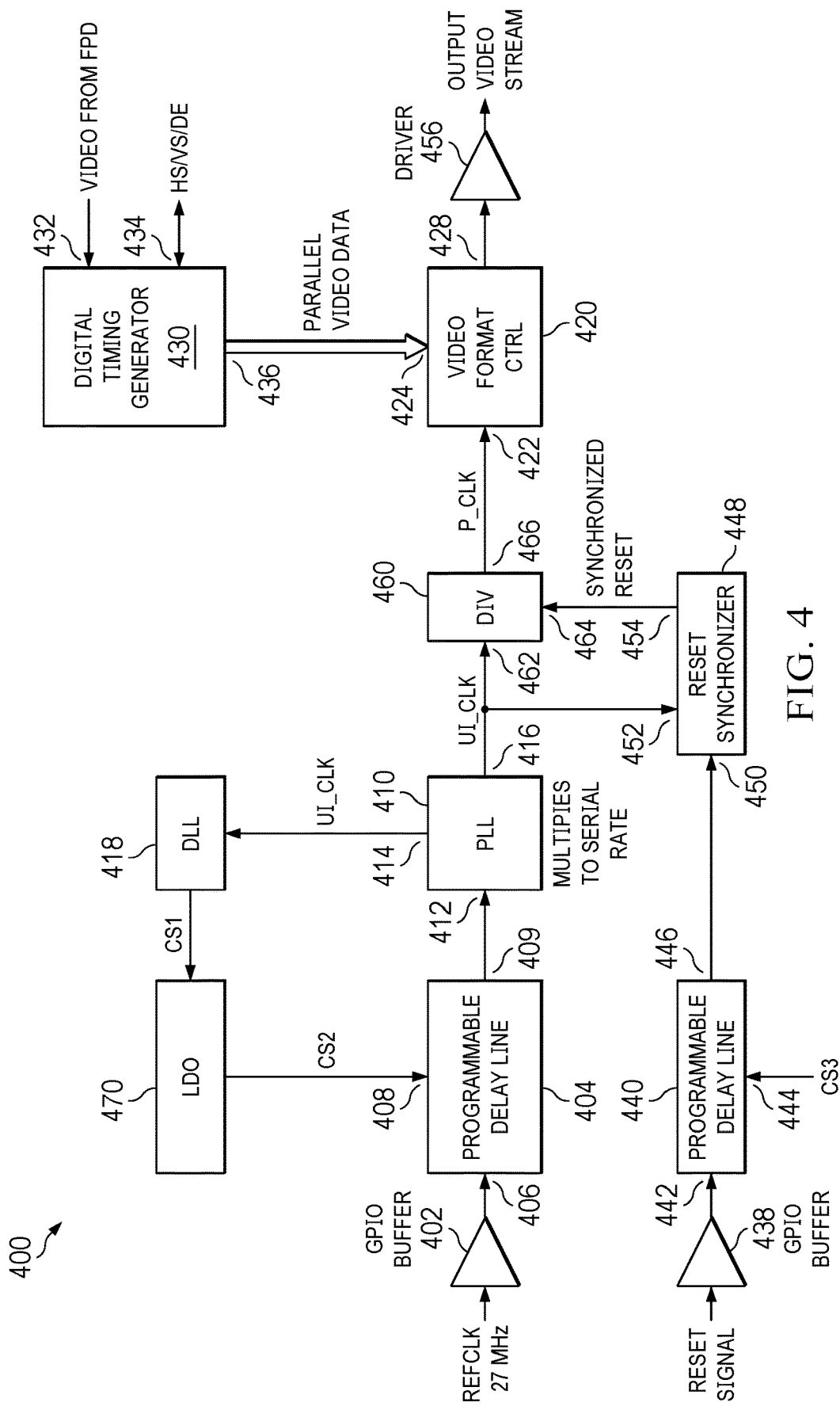
FIG. 4 is a block diagram showing example circuitry of a video transfer circuit.

FIG. 4 is a block diagram showing example circuitry of a video transfer circuit 400. The video transfer circuit 400 is an example of the first de-serializer 110 in FIG. 1, the second de-serializer 114 in FIG. 1, the first video transfer circuit 201 in FIG. 2, or second video transfer circuit 211 in FIG. 2. In the example of FIG. 4, the video transfer circuit 400 includes a first GPIO buffer 402, a first programmable delay line 404, a phase-locked loop (PLL) 410, a delay locked-loop (DLL) 418, a low-dropout regulator (LDO) 470, a video format controller 420, a divider 460, a digital timing generator 430, a second GPIO buffer 438, a second programmable delay line 440, a reset synchronizer circuit 448, and driver circuitry 456 in the arrangement shown. In the example of FIG. 4, the driver circuitry 456 is an example of the driver circuitry 206 or the driver circuitry 216 in FIG. 2. The first programmable delay line 404 and the second programmable delay line 440 are examples of the programmable delay circuitry 204 or the programmable delay circuitry 214 in FIG. 2. In the example of FIG. 4, the video transfer circuit 400 includes circuitry related to synchronized reset operations. The video transfer circuit 400 may also include other components and/or interfaces (not shown). Other example components (not shown) for the video transfer circuit 400 may include de-serialization components, FPD-link interfaces, video timing signal sharing components, P_CLK calibration components, multiplexers to select between local sync signals and shared sync signals, and/or other components.

In some examples, the first GPIO buffer 402 has an input and an output. The first programmable delay line 404 has a first input 406, a second input 408, and an output 409. The PLL 410 has an input 412, a first output 414, and a second output 416. The DLL 418 has an input and an output. The LDO 470 has an input and an output. The video format controller 420 has a first input 422, a second input 424, and an output 428. The divider 460 has a first input 462, a second input 464, and an output 466. The digital timing generator 430 has an input 432, a video timing signal interface 434, and an output 436. The second GPIO buffer 438 has an input and an output. The second programmable delay line 440 has a first input 442, a second input 444, and an output 446. The reset synchronizer circuit 448 has a first input 450, a second input 452, and an output 454. The driver circuitry 456 has an input and an output.

As shown, the input of the first GPIO buffer 402 receives REFCLK. In some examples, REFCLK is 27 MHz. The output of the first GPIO buffer 402 is coupled to the first input 406 of the first programmable delay line 404. The second input 408 of the first programmable delay line 404 is coupled to the output of the LDO 470 and receives a control signal (CS2). The output 409 of the first programmable delay line 404 is coupled to the input 412 of the PLL 410 and provides a delayed version of REFCLK responsive to CS2. The first output 414 of the PLL 410 is coupled to the input of the DLL 418 and provides UI_CLK. The output of the DLL 418 is coupled to the input of the LDO 470 and provides a control signal (CS1).

The second output 416 of the PLL 410 is coupled to the first input 462 of the divider 460 and provides UI_CLK. The second output 416 of the PLL 410 is also coupled to the second input 452 of the reset synchronizer circuit 448. In some examples, the second output 416 of the PLL 410 is omitted. In such examples, the first output 414 of the PLL 410 is coupled to input of the DLL 418, the first input 462 of the divider 460, and the second input 452 of the reset synchronizer circuit 448. The second input 464 of the divider 460 is coupled to the output 454 of the reset synchronizer circuit 448. The output 466 of the divider 460 is coupled to the first input 422 of the video format controller 420 and provides P_CLK. The second input 424 of the video format controller 420 is coupled to the output 436 of the digital timing generator 430. The output 428 of the video format controller 420 is coupled to the input of the driver circuitry 456. The output of the driver circuitry 456 provides the output video stream of the video transfer circuit 400.

As shown, the input of the second GPIO buffer 438 receives a reset signal. The reset signal may be a local reset signal or a shared reset signal depending on whether the video transfer circuit 400 is being used as a primary video transfer circuit or a secondary video transfer circuit. The output of the second GPIO buffer 438 is coupled to the first input 442 of the second programmable delay line 440. The second input 444 of the second programmable delay line 440 receives a control signal (CS3). CS3 may vary so that the reset signal reaches the first input 450 of the reset synchronizer 448 at a target latency. In some examples, the video transfer circuit 400 is a secondary video transfer circuit and the reset signal is a shared reset signal received from a primary video transfer circuit. In other examples, the video transfer circuit 400 is a primary video transfer circuit and the reset signal is a local reset signal provided to the first input 442 of the second programmable delay line 440. A local reset signal may be provided to the first input 442 of the second programmable delay line 440 without passing through the second GPIO buffer 438. The output 446 of the second programmable delay line 440 is coupled to the first input 450 of the reset synchronizer circuit 448. As previously noted, the second input 452 of the reset synchronizer circuit 448 is coupled to the second output 416 of the PLL 410, and the output 454 of the reset synchronizer circuit 448 is coupled to the second input 464 of the divider 460.

In some examples, the first GPIO buffer 402 operates to pass REFCLK at the input of the first GPIO buffer 402 to the output of the first GPIO buffer 402. The first programmable delay line 404 operates to: receive REFCLK at first input 406 of the first programmable delay line 404; receive CS2 at the second input 408 of the first programmable delay line 404; and provide a delayed version of REFCLK at the output 409 of the first programmable delay line 404 responsive to REFCLK and CS2. The PLL 410 operates to: receive the delayed version of REFCLK at the input 412 of the PLL 410; provide UI_CLK at the first output 414 and/or the second output 416 of the PLL 410 responsive to the delay version of REFCLK. The DLL 418 operates to provide CS1 at the output of the DLL 418 responsive to UI_CLK received at the input of the DLL 418. The LDO 470 operates to: receive CS1 at its input and provide CS2 at its output responsive to CS1. In some examples, CS2 is a voltage level that varies to increase or decrease the delay applied by the first programmable delay line 404 to REFCLK.

The divider 460 operates to: receive UI_CLK at its first input 462; receive a synchronized reset signal at its second input 464; and provide P_CLK at its output 466 responsive to UI_CLK and the synchronized reset signal. The video format controller 420 operates to: receive P_CLK at the first input 422 of the video format controller 420; receive parallel video data at the second input 424 of the video format controller 420; and provide serialized video data at the output 428 of the video format controller 420 responsive to the parallel video data and P_CLK. The driver circuitry 456 operates to receive the serialized video data at its input and provide the output video stream of the video transfer circuit 400 at its output. The output video stream has a voltage level, current level, and clock rate based on a serial communication protocol such as OLDI.

In some examples, the second GPIO buffer 438 operates to pass the reset signal at the input of the second GPIO buffer 438 to the output of the second GPIO buffer 438. The second programmable delay line 440 operates to: receive the reset signal at first input 442 of the second programmable delay line 440; receive CS3 at the second input 444 of the second programmable delay line 440; and provide a delayed version of the reset signal at the output 446 of the second programmable delay line 440 responsive to the reset signal and CS3. The reset synchronizer circuit 448 operates to: receive the delayed reset signal at the first input 450 of the reset synchronizer circuit 448; receive UI_CLK at the second input 452 of the reset synchronizer circuit 448; and provide a synchronized reset at the output 454 of the reset synchronizer circuit 448 responsive to UI_CLK and the delayed reset signal. The synchronized reset is aligned, for example, with one of the edges of UI_CLK. The synchronized reset is received at the second input 464 of the divider 460. The timing of the synchronized reset determines the clock edge of P_CLK, which is used to provide video data at the output 428 of the video format controller 420.

With the video transfer circuit 400, the output video stream provided by the driver circuitry 456 is synchronized with another video transfer circuit's output video stream responsive to shared video timing signals (VS, HS, and DE), the synchronized reset signal, and/or P_CLK calibration. The shared video timing signals are provided from or to the video timing signal interface 434 of the digital timing generator 430 responsive to a mode selection for the video transfer circuit 400. In some examples, the video transfer circuit 400 operates as a primary video transfer circuit and sends shared video timing signals to a second video transfer circuit via the video timing signal interface 434. In other examples, the video transfer circuit 400 operates as a secondary video transfer circuit and receives shared video timing signals from a primary video transfer circuit via the via the video timing signal interface 434. In some examples, the operations of the second programmable delay line 440 are used to adjust delay of the reset signal. In different examples, the first programmable delay line 404, the second programmable delay line 440, or other programmable delay lines may be used to adjust the propagation time of local or shared sync signals (e.g., a reset signal and/or video timing signals) and/or to perform P_CLK calibration.

Figure 5:
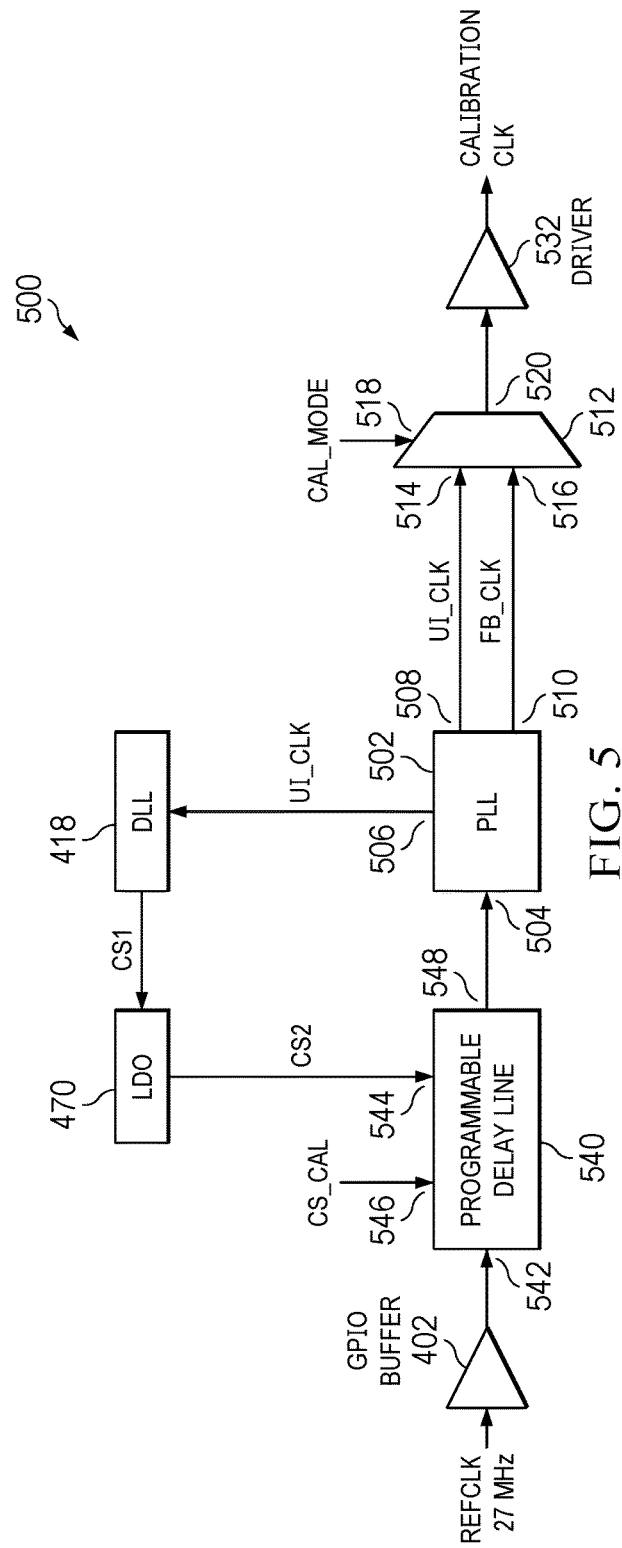
FIG. 5 is a block diagram more example circuitry of a video transfer circuit.

FIG. 5 is a block diagram showing other example circuitry of a video transfer circuit 500. The video transfer circuit 500 is an example of the first de-serializer 110 in FIG. 1, the second de-serializer 114 in FIG. 2, the first video transfer circuit 201 in FIG. 2, or the first video transfer circuit 201 in FIG. 2. In the example of FIG. 5, the video transfer circuit 500 includes the first GPIO buffer 402, a programmable delay line 540, a PLL 502, the DLL 418, the LDO 470, a multiplexer 512, and driver circuitry 532 in the arrangement shown. In the example of FIG. 5, the driver circuitry 532 is an example of the driver circuitry 206 or the driver circuitry 216 in FIG. 2. In the example of FIG. 5, the video transfer circuit 500 includes circuitry for P_CLK calibration. The video transfer circuit 500 may also include other components and/or interfaces (not shown). Other example components (not shown) for the video transfer circuit 500 may include de-serialization components, FPD-link interfaces, video timing signal sharing components, reset signal sharing components, a video format controller, multiplexers to select between local sync signals and shared sync signals, and/or other components.

The first GPIO buffer 402 and the DLL 418 have the same inputs and outputs described in FIG. 4. The programmable delay line 540 has a first input 542, a second input 544, a third input 546, and an output. The PLL 502 has an input 504, a first output 506, a second output 508, and a third output 510. The multiplexer 512 has a first input 514, a second input 516, a third input 518, and an output 520.

As shown, the input of the first GPIO buffer 402 receives REFCLK. In some examples, REFCLK is 27 MHz. The output of the first GPIO buffer 402 is coupled to the first input 542 of the programmable delay line 540. The second input 544 of the programmable delay line 540 is coupled to the output of the LDO 470. The output 548 of the programmable delay line 540 is coupled to the input 504 of the PLL 502 and provides a delayed version of REFCLK. The first output 506 of the PLL 502 is coupled to the input of the DLL 418 and provides UI_CLK. The second output 508 of the PLL 502 is coupled to the first input 514 of the multiplexer 512 and provides UI_CLK. In some examples, the second output 508 of the PLL 502 is omitted. In such examples, the first output 506 of the PLL 502 is coupled to the input of the DLL 418 and the first input 514 of the multiplexer 512. The third output 510 of the PLL 502 is coupled to the second input 516 of the multiplexer 512 and provides a feedback clock signal (FB_CLK). In some examples, FB_CLK has the same frequency as REFCLK. The third input 518 of the multiplexer 512 receives a calibration mode signal (CAL_MODE). As shown, the output of the multiplexer 512 is coupled to the input of the driver circuitry 532. The output of the driver circuitry 532 provides a calibration clock.

In some examples, CAL_MODE is used when determining the latency of generating a calibration clock at the output of the driver circuitry 532 responsive to REFCLK, the operations of the PLL 502, and the path from the first GPIO buffer 402 to the driver circuitry 532. In some examples, the latency of providing calibration clock is compared with a target latency. The difference between the calibration clock latency and the target latency is used to generate a calibration control signal (CS_CAL). In some examples, CS_CAL is determined by test circuitry and is a one-time calibration that adjust P_CLK based in part on the latency to generate the calibration clock relative to a target.

In the example of FIG. 5, CS_CAL is provided to the third input 546 of the programmable delay line 540. Based on CS_CAL, the programmable delay line 540 is able to adjust UI_CLK generation latency and related P_CLK generation latency to account for the propagation delay indicated by the calibration clock. Over time, the operations of the PLL 502, the DLL 418, and the LDO 470 enable dynamic adjustments to UI_CLK generation latency and related P_CLK generation latency based on CS2 to account for voltage and temperature variance.

In some examples, the first GPIO buffer 402 operates to pass REFCLK at the input of the first GPIO buffer 402 to the output of the first GPIO buffer 402. The first programmable delay line 404 operates to: receive REFCLK at first input 542 of the programmable delay line 540; receive CS2 at the second input 544 of the first programmable delay line 404; receive CS_CAL at the third input 546; and provide a delayed version of REFCLK at the output 548 of the first programmable delay line 540 responsive to REFCLK, CS_CAL, and CS2. The PLL 502 operates to: receive the delayed version of REFCLK at the input 504 of the PLL 502; provide UI_CLK at the first and second outputs 506 and 508 of the PLL 502 responsive to the delayed version of REFCLK; and provide FB_CLK at the third output 510 of the PLL 502 responsive to the delayed version of REFCLK. The DLL 418 operates to provide CS1 at the output of the DLL 418 responsive to UI_CLK at the input of the DLL 418. The LDO 470 operates to provide CS2 at its output responsive to UI_CLK at its input. In some examples, CS2 is a voltage level that varies to increase or decrease the delay applied by the programmable delay line 540 to REFCLK.

In some examples, the multiplexer 512 operates to: receive UI_CLK at its first input 514; receive FB_CLK at its second input 516; receive CAL_MODE at its third input 518 of; and provide UI_CLK or FB_CLK at its output 520 responsive to CAL_MODE. During P_CLK calibration (e.g., CAL_CS=1), the driver circuitry 532 receives FB_CLK at its input and provide the calibration clock at its output. During video transfer operations, the driver circuitry 532 receives the output of a video format controller (e.g., CAL_CS=0), such as the video format controller 420 in FIG. 4), at its input and provides an output video steam at its output.

Figure 6:
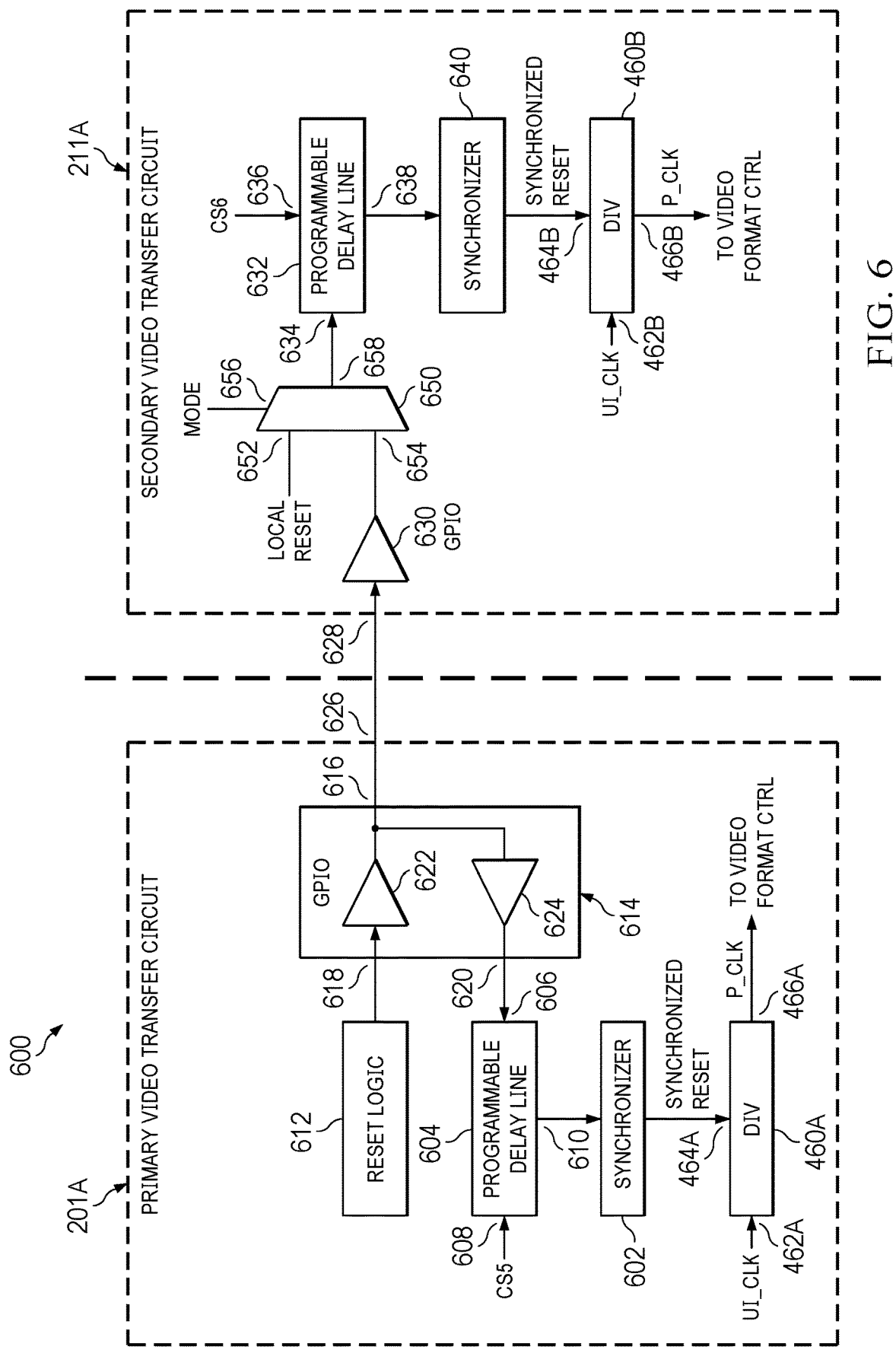
FIG. 6 is a block diagram showing an example set of video transfer circuits.

FIG. 6 is a block diagram showing an example set of video transfer circuits 600. As shown, the set of video transfer circuits 600 includes a primary video transfer circuit 201A and a secondary video transfer circuit 211A. The primary video transfer circuit 201A is an example of the first de-serializer 110 in FIG. 1, or the first video transfer circuit 201 in FIG. 2. The secondary video transfer circuit 211A is an example of the second de-serializer 114 in FIG. 1, or the second video transfer circuit 211 in FIG. 2. In FIG. 6, each of the primary video transfer circuit 201A and the secondary video transfer circuit 211A include synchronized reset circuitry. The primary video transfer circuit 201A and the secondary video transfer circuit 211A may each include other components and/or interfaces (not shown). Other example components (not shown) for the primary video transfer circuit 201A and the secondary video transfer circuit 211A may include de-serialization components, FPD-link circuitry, video timing signal sharing components, a video format controller, multiplexers to select between local sync signals and shared sync signals, and/or other components.

As shown, the primary video transfer circuit 201A has an output 626 and includes a synchronizer circuit 602, a programmable delay line 604, reset logic 612, a GPIO 614, and a divider 460A. The divider 460A is an example of the divider 460 in FIG. 4. The synchronizer circuit 602 is an example of the reset synchronizer circuit 448 of FIG. 4. The programmable delay line 604 is an example of the programmable delay circuitry 204 of FIG. 2, or the second programmable delay line 440 of FIG. 4.

As shown, the reset logic 612 has an output. The GPIO 614 has a first terminal 616, a second terminal 618, and a third terminal 620. In some examples, the GPIO 614 includes a first GPIO buffer 622 and a second GPIO buffer 624. The first GPIO buffer 622 has an input and an output. The second GPIO buffer 624 has an input and an output. The programmable delay line 604 has a first input 606, a second input 608, and an output 610. The synchronizer circuit 602 has an input and an output. The divider 460A has a first input 462A, a second input 464A, and an output 466A.

In some examples, the output of the reset logic 612 is coupled to the second terminal 618 of the GPIO 614. The second terminal 618 of the GPIO 614 is coupled to the input of the first GPIO buffer 622. The output of the first GPIO buffer 622 is coupled to the first terminal 616 of the GPIO 614 and the input of the second GPIO buffer 624. The first terminal 616 of the GPIO 614 is coupled to the output 626 of the primary video transfer circuit 201A. The output of the second GPIO buffer 624 is coupled to the third terminal 620 of the GPIO 614. The third terminal 620 of the GPIO 614 is coupled to the first input 606 of the programmable delay line 604. The second input 608 of the programmable delay line 604 receives a control signal (CS5). The output 610 of the programmable delay line 604 is coupled to the input of the synchronizer circuit 602. The output of the synchronizer circuit 602 provides a synchronized reset to the second input 464A of the divider 460A. The first input 462A of the divider 460A receives UI_CLK. The output 466A provides P_CLK to a video format controller such as the video format controller 420 in FIG. 4.

The secondary video transfer circuit 211A has an input 628 and includes a GPIO buffer 630, a multiplexer 650, a programmable delay line 632, a synchronizer circuit 640, and a divider 460B. The divider 460B is an example of the divider 460 in FIG. 4. The synchronizer circuit 640 is an example of the reset synchronizer circuit 448 of FIG. 4. The programmable delay line 632 is an example of the programmable delay circuitry 204 of FIG. 2, or the second programmable delay line 440 of FIG. 4. The GPIO buffer 622 has an input and an output. The multiplexer 650 has a first input 652, a second input 654, a third input 656, and an output 658. The programmable delay line 632 has an first input 634, a second input 636, and an output 638. The synchronizer circuit 640 has an input and an output. The divider 460B has a first input 462B, a second input 464B, and an output 466B.

The input 628 of the secondary video transfer circuit 211A is coupled to the input of the GPIO buffer 630. The output of the GPIO buffer 630 is coupled to the second input 654 of the multiplexer 650. The first input 652 of the multiplexer 650 receives a local reset signal. The local reset signal may be provided by reset logic (not shown) of the secondary video transfer circuit 211A. The third input 656 of the multiplexer 650 receives a mode signal (MODE). The mode signal is provided, for example, from control circuitry such as the control circuitry 212 of FIG. 2, the mode controller 829 in FIG. 8, or the mode controller 862 in FIG. 8. The output 658 of the multiplexer 650 is coupled to the first input 634 of the programmable delay line 632. The second input 636 of the programmable delay line 632 receives a control signal (CS6). The output 638 of the programmable delay line 632 is coupled to the input of the synchronizer circuit 602. The output of the synchronizer circuit 640 is coupled to the second input 464B of the divider 460B and provides a synchronized reset signal. The first input 462B of the divider 460B receives UI_CLK. The output 466B of the divider 460B provides P_CLK responsive to UI_CLK and the synchronized reset signal. P_CLK is provided to a video format controller (not shown) such as the video format controller 420 in FIG. 4.

In some examples, the reset logic 612 of the primary video transfer circuit 201A provides a reset signal responsive to its local PLL (e.g., PLL 410 in FIG. 4, PLL 502 in FIG. 5, or PLL 410A in FIG. 7A) being locked. The reset signal is provided to the programmable delay line 604 via the second GPIO buffer 624 of the GPIO 614. The reset signal is delayed by the programmable delay line 604 responsive to CS5. In different examples, CS5 varies to adjust the latency providing a local reset signal or shared reset signal to the synchronizer circuit 602. The delayed reset signal is provided to the synchronizer circuit 602. The synchronizer circuit 602 provides a synchronized reset signal to the divider 460A to control timing of one or more edges of P_CLK responsive to the synchronized reset signal. In some examples, P_CLK is provided to a video format controller such as the video format controller 420 of FIG. 4.

The reset signal from the reset logic 612 is also provided to the secondary video transfer circuit 211A via the first GPIO buffer 622 of the GPIO 614. The reset signal is received at the input 628 of the secondary video transfer circuit 211A and is provided to the second input 654 of the multiplexer 650 via the GPIO buffer 630. Responsive to the mode signal indicating a secondary mode for the secondary video transfer circuit 211A, the reset signal received from the primary video transfer circuit 201A is forwarded to the programmable delay line 632. The programmable delay line 632 adds a delay to the reset signal responsive to CS6. In different examples, CS6 varies to adjust the latency providing a local reset signal or shared reset signal to the synchronizer circuit 640. The synchronizer circuit 640 provides a synchronized reset signal to the divider 460B responsive to the reset signal provided by the primary video transfer circuit 201A, the operations of the programmable delay line 632, the operations of the synchronizer circuit 640, and a clock signal such as UI_CLK. In some examples, the synchronizer circuit 640 aligns the input reset signal with one of the edges of a clock signal such as UI_CLK.

Figure 7A:
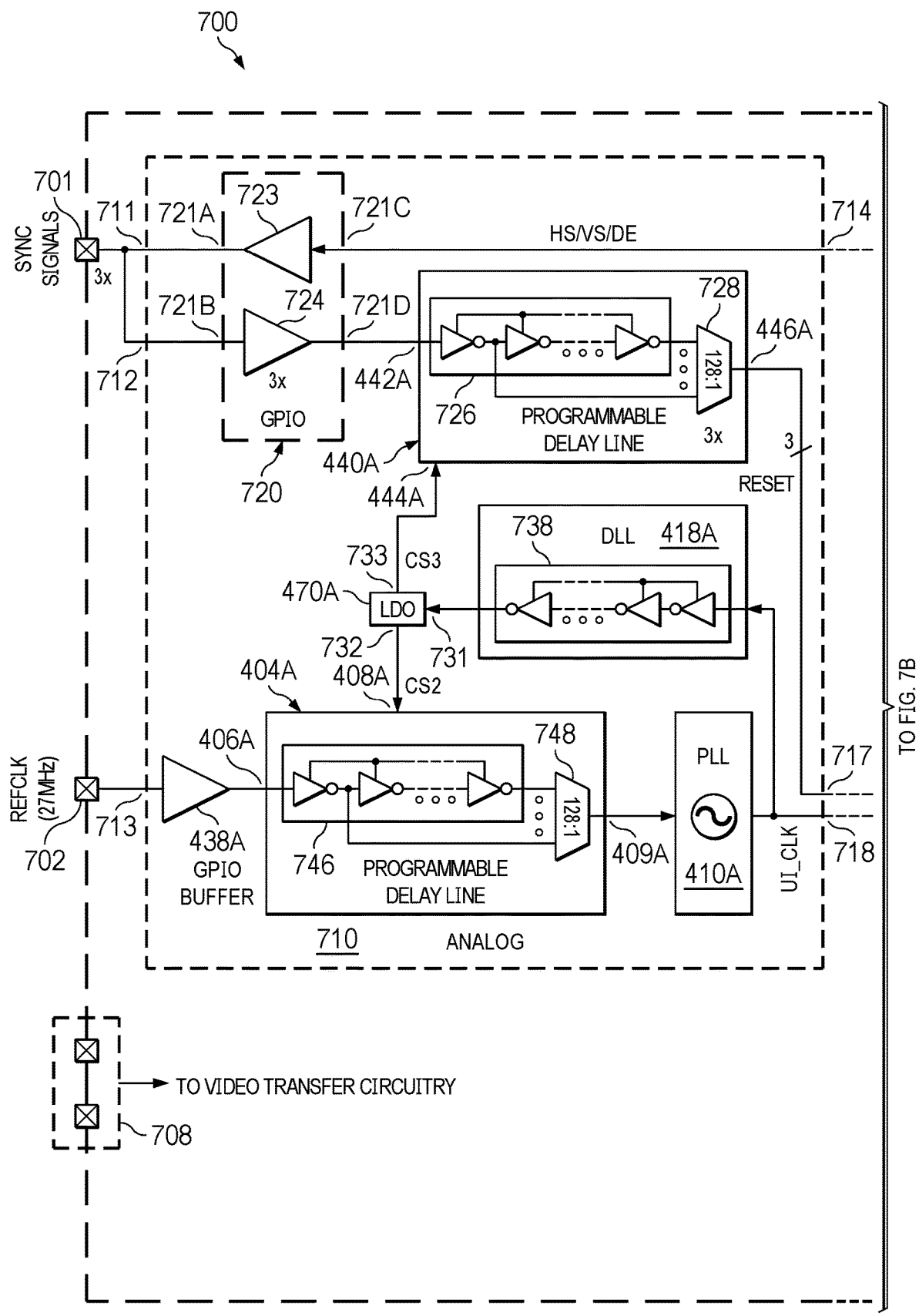
FIGS. 7A and 7B is a diagram showing more example circuitry of a video transfer circuit.
Figure 7B:
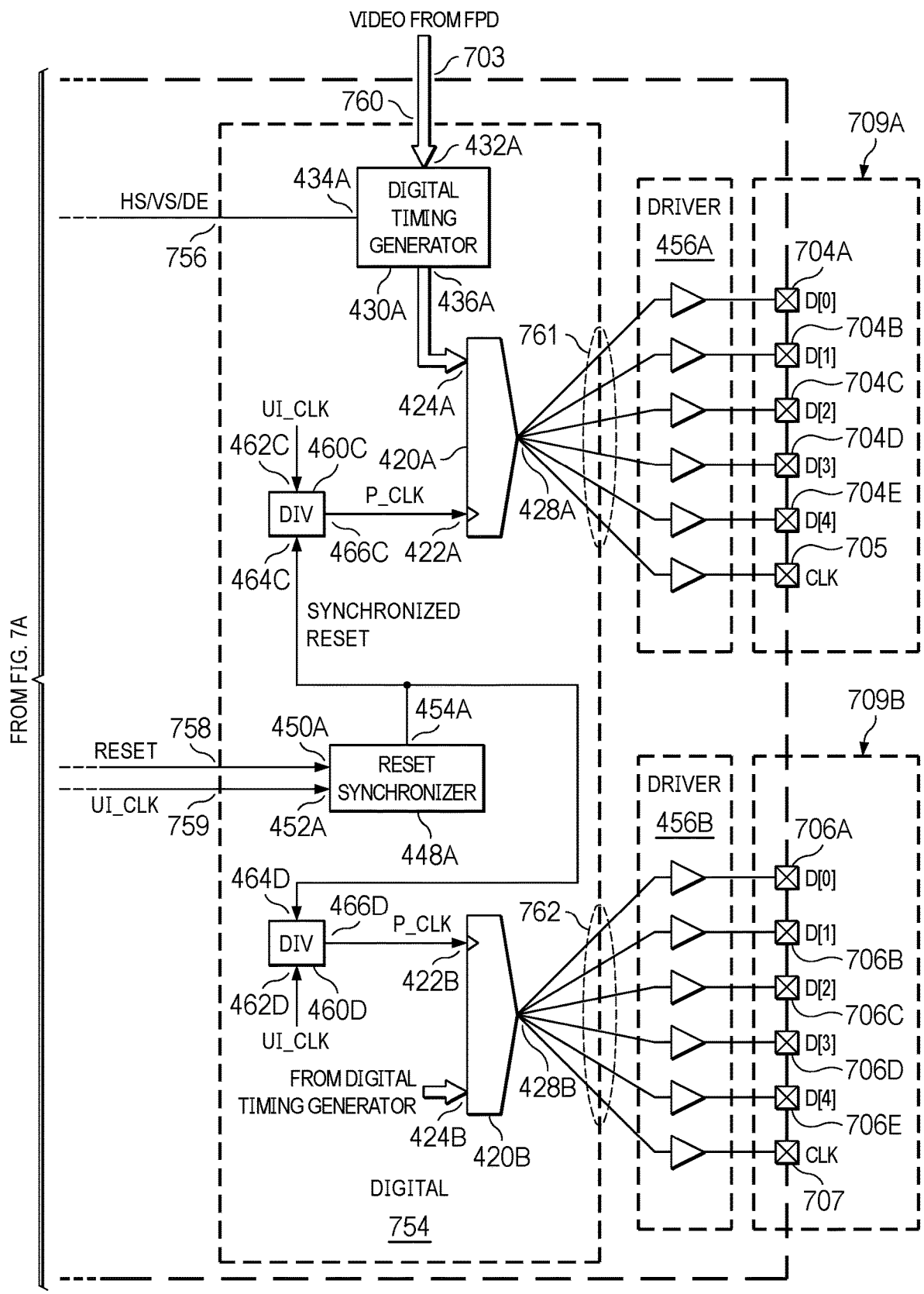

FIGS. 7A and 7B is a diagram showing more example circuitry of a video transfer circuit 700. The video transfer circuit 700 is an example of the first de-serializer 110 of FIG. 1, the second de-serializer 114 of FIG. 1, the first video transfer circuit 201 of FIG. 2, the second video transfer circuit 211 of FIG. 2, the primary video transfer circuit 201A of FIG. 6, or the secondary video transfer circuit 211A of FIG. 6. In the example of FIGS. 7A and 7B, the video transfer circuit 700 includes sync signal sharing circuitry. Example sync signals include a reset signal and video timing signals (e.g., VS, HS, and DE). The video transfer circuit 700 may also include other components and/or interfaces (not shown). Other example components (not shown) for the video transfer circuit 700 may include de-serialization components, FPD-link interfaces, P_CLK calibration circuitry, multiplexers to select between local sync signals and shared sync signals, and/or other components.

In the example of FIGS. 7A and 7B, the video transfer circuit 700 has an input interface 708. The input interface 708 includes one more input terminals to receive video data. In some examples, the input interface 708 is a serial interface to receive one or more FPD-link serial streams. In some examples, video steams received via the input interface 708 are provided to de-serialization circuitry (not shown) and/or other circuitry.

As shown, the video transfer circuit 700 also has a first terminal 701, a second terminal 702, a third terminal or interface 703, a first output interface 709A, and a second output interface 709B. In some examples, the first terminal 701 is repeated (e.g., 3×). In some examples, the first output interface 709A includes a fourth terminal 704A, a fifth terminal 704B, a sixth terminal 704C, a seventh terminal 704D, an eighth terminal 704E, a ninth terminal 705. The second output interface 709B includes a tenth terminal 706A, an eleventh terminal 706B, a twelfth terminal 706C, a thirteenth terminal 706D, a fourteenth terminal 706E, and a fifteenth terminal 707. In some examples, each of the first and second output interfaces 709A and 709B provides FPD-Link III channels and a related clock signal. In some examples, the second output interface 709B may be omitted. In such case, the second data video format controller 420B is omitted.

In the example of the FIGS. 7A and 7B, the video transfer circuit 700 includes analog circuitry 710, digital circuitry 754, first driver circuitry 456A, and second driver circuitry 456B. The first driver circuitry 456A and second driver circuitry 456B may be considered part of the analog circuitry 710. The first driver circuitry 456A and second driver circuitry 456B are examples of the driver circuitry 456 of FIG. 4.

The analog circuitry 710 has a first terminal 711, a second terminal 712, a third terminal 713, a fourth terminal 714, a fifth terminal 717, and a sixth terminal 718. The analog circuitry 710 includes a GPIO 720, a first programmable delay line 404A, a DLL 418A, an LDO 470A, a GPIO buffer 438A, a second programmable delay line 440A, and a PLL 410A. The first programmable delay line 404A is an example of the first programmable delay line 404 of FIG. 4. The DLL 418A is an example of the DLL 418 of FIG. 4. The LDO 470A is an example of the LDO 470 in FIGS. 4 and 5. The GPIO buffer 438A is an example of the second GPIO buffer 438 in FIG. 4. The second programmable delay line 440A is an example of the second programmable delay line 440 of FIG. 4. The PLL 410A is an example of the PLL 410 of FIG. 4.

As shown, the GPIO 720 has a first terminal 721A, a second terminal 721B, a third terminal 721C, and a fourth terminal 721D. The GPIO 720 includes a first GPIO buffer 723 and a second GPIO buffer 724. In some examples, the GPIO 720 and its related inputs/outputs and components are repeated three times (3×). The first programmable delay line 404A includes a first input 406A, a second input 408A, and an output 409A. The first input 406A, the second input 408A, and the output 409A of the first programmable delay line 404A are respective examples of the first input 406, the second input 408, and the output 409 of the first programmable delay line 404 in FIG. 4. The first programmable delay line 404A includes a set of delay components 746 and a multiplexer 748. Without limitation, the set of delay components 746 may provide 128 delay options and the multiplexer 748 may select one of the 128 delay options responsive to CS2. In some examples, the first programmable delay line 404A and its related inputs/outputs and components are repeated three times (3×). The DLL 418A has an input and an output. The DLL includes a set of delay lock components 738. The LDO 470A includes an input 731, a first output 732, and a second output 733. The GPIO buffer 438A has an input and an output. The second programmable delay line 440A has a first input 442A, a second input 444A, and an output 446A. The first input 442A, the second input 444A, and the output 446A are respective examples of the first input 442, the second input 444, and the output 446 of the second programmable delay line 440 in FIG. 4. The second programmable delay line 440A includes a set of delay components 726 and a multiplexer 728. Without limitation, the set of delay components 726 may provide 128 delay options and the multiplexer 728 may select one of the 128 delay options responsive to CS3. The PLL 410A includes an input and an output.

The digital circuitry 754 has a first terminal 756, a second terminal 758, a third terminal 759, a fourth terminal 760, a first set of outputs 761, and a second set of outputs 762. The digital circuitry 754 includes a digital timing generator 430A, a first video format controller 420A, a second video format controller 420B, a first divider 460C, a second divider 460D, and a reset synchronizer circuit 448A. In some examples, only one of the first and second dividers 460C and 460D is used, and the output (P_CLK) is shared. The digital timing generator 430A is an example of the digital timing generator 430 in FIG. 4. The first video format controller 420A is an example of the video format controller 420 in FIG. 4. The second video format controller 420B is also an example of the video format controller 420 in FIG. 4. The reset synchronizer circuit 448A is an example of the reset synchronizer circuit 448 in FIG. 4. The first divider 460C and the second divider 460D are examples of the divider 460 in FIG. 4.

The digital timing generator 430A has an input 432A, a video timing signal interface 434A, and an output 436A. The input 432A, the video timing signal interface 434A, and the output 436A of the digital timing generator 430A are respective examples of the input 432, the video timing signal interface 434, and the output 436 of the digital timing generator 430 in FIG. 4. The first video format controller 420A has a first input 422A, a second input 424A, and an output 428A. The first input 422A, the second input 424A, and the output 428A of the first video format controller 420A are respective examples of the first input 422, the second input 424, and the output 428 of the video format controller 420 in FIG. 4. The second video format controller 420B has a first input 422B, a second input 424B, and an output 428B. The first input 422B, the second input 424B, and the output 428B of the second video format controller 420B are respective examples of the first input 422, the second input 424, and the output 428 of the video format controller 420 in FIG. 4.

The reset synchronizer circuit 448A has a first input 450A, a second input 452A, an output 454A. The first divider 460C has a first input 462C, a second input 464C, and an output 466C. The second divider 460D has a first input 462D, a second input 464D, and an output 466D. The first driver circuitry 456A includes a respective buffer for each of the fourth terminal 704A, the fifth terminal 704B, the sixth terminal 704C, the seventh terminal 704D, the eighth terminal 704E, and the ninth terminal 705 of the video transfer circuit 700. The second driver circuitry 456B includes a respective buffer for each of the tenth terminal 706A, the eleventh terminal 706B, the twelfth terminal 706C, the thirteenth terminal 706D, the fourteenth terminal 706E, and the fifteenth terminal 707 of the video transfer circuit 700. Each of the buffers of the first driver circuitry 456A and the second driver circuitry 456B has a respective input and a respective output.

In some examples, the first terminal 701 of the video transfer circuit 700 is coupled to the first terminal 711 and second terminal 712 of the analog circuitry 710. The first terminal 711 of the analog circuitry 710 is coupled to the first terminal 721A and the second terminal 721B of the GPIO 720. The output of the first GPIO buffer 723 is coupled to the first terminal 721A of the GPIO 720. The input of the first GPIO buffer 723 is coupled to the third terminal 721C of the GPIO 720. The input of the second GPIO buffer 724 is coupled to the second terminal 721B of the GPIO 720. The output of the second GPIO buffer 724 is coupled to the fourth terminal 721D of the GPIO 720. The third terminal 721C of the GPIO 720 is coupled to the fourth terminal 714 of the analog circuitry 710. The fourth terminal 721D of the GPIO 720 is coupled to the first input 442A of the second programmable delay line 440A. The second input 444A of the second programmable delay line 440A is coupled to the second output 733 of the LDO 470A and receives CS3. The output 446A of the second programmable delay line 440A is coupled to the fifth terminal 717 of the analog circuitry 710.

The second terminal 702 of the video transfer circuit 700 is coupled to the third terminal 713 of the analog circuitry 710. The third terminal 713 of the analog circuitry 710 is coupled to the input of the GPIO buffer 438A. The output of the GPIO buffer 438A is coupled to first input 406A of the first programmable delay line 404A. The second input 444A of the first programmable delay line 404A is coupled to the first output 732 of the LDO 470A and receives CS1. The output of the first programmable delay line 404A is coupled to the input of the PLL 410A. The output of the PLL 410A is coupled to the sixth terminal 718 of the analog circuitry 710 and the input of the DLL 418A. The output of the DLL 418A is coupled to the input 731 of the LDO 470A.

The first terminal 756 of the digital circuitry 754 is coupled to the fourth terminal 714 of the analog circuitry 710. The second terminal 758 of the digital circuitry 754 is coupled to the fifth terminal 717 of the analog circuitry 710. The third terminal 759 of the digital circuitry 754 is coupled to the sixth terminal 718 of the analog circuitry 710. The fourth terminal 760 of the digital circuitry 754 is coupled to the third terminal or interface 703 of the video transfer circuit 700. The first set of outputs 761 are coupled to respective inputs of the buffers of the first driver circuitry 456A. The outputs of the buffers of the first driver circuitry 456A are respectively coupled to the fourth terminal 704A, the fifth terminal 704B, the sixth terminal 704C, the seventh terminal 704D, the eighth terminal 704E, and the ninth terminal 705 of the video transfer circuit 700. In some examples, the voltages and/or currents provided by the buffers of the first driver circuitry 456A are based on a serial communication standard such as OLDI or LVDS.

In some examples, the fourth terminal 704A is a first data terminal (labeled "D[0]") of the first output interface 709A such as an OLDI or LVDS serial interface. The first output interface 709A may provide an output video stream and a clock signal to a first display or first section of a display. The fifth terminal 704B is a second data terminal (labeled "D[1]") of the first output interface 709A. The sixth terminal 704C is a third data terminal (labeled "D[2]") of the first output interface 709A. The seventh terminal 704D is a fourth data terminal (labeled "D[3]") of the first output interface 709A. The eighth terminal 704E is a fifth data terminal (labeled "D[4]") of the first output interface 709A. The ninth terminal 705 is a clock terminal (labeled "CLK") of the first output interface 709A.

The second set of outputs 762 are coupled to respective inputs of the buffers of the second driver circuitry 456B. The outputs of the buffers of the second driver circuitry 456B are respectively coupled to the tenth terminal 706A, the eleventh terminal 706B, the twelfth terminal 706C, the thirteenth terminal 706D, the fourteenth terminal 706E, and the fifteenth terminal 707 of the video transfer circuit 700. In some examples, the voltages and/or currents provided by the buffers of the second driver circuitry 456B are based on a serial communication standard such as OLDI or LVDS.

In some examples, the tenth terminal 706A is a first data terminal (labeled "D[0]") of a second output interface 709B such as an OLDI or LVDS serial interface. The second output interface 709B may provide an output video stream and a clock signal to a second display or second section of a display. The eleventh terminal 706B is a second data terminal (labeled "D[1]") of the second output interface 709B. The twelfth terminal 706C is a third data terminal (labeled "D[2]") of the second output interface 709B. The thirteenth terminal 706D is a fourth data terminal (labeled "D[3]") of the second output interface 709B. The fourteenth terminal 706E is a fifth data terminal (labeled "D[4]") of the second output interface 709B. The fifteenth terminal 707 is a clock terminal (labeled "CLK") of the second output interface 709B.

In some examples, the video transfer circuit 700 operates as a primary video transfer circuit. In such examples, the video transfer circuit 700 operates to: convey synchronization signals (e.g., a reset signal and/or video timing signals such as VS, HS, and DE) to a secondary video transfer circuit via the first terminal 701 and GPIOs such as the GPIO 720; delay local synchronization signals (e.g., a local reset signal and/or local video timing signals such as VS, HS, and DE) using available programmable delay lines; perform local P_CLK calibration; and provide an output video stream responsive to the local reset signal, the local video timing signals, and the local P_CLK calibration.

In some examples, the video transfer circuit 700 performs local P_CLK calibration based on: receiving REFCLK at the second terminal 702; generating CS_CAL (not shown) as described in FIG. 5; generating CS2 responsive to UI_CLK and a feedback loop that includes the DLL 418A and the LDO 470A; adjusting a delay of the first programmable delay line 404A responsive to CS2 and CS_CAL; and generating P_CLK from REFCLK based on the adjusted delay of the first programmable delay line 404A.

In some examples, the video transfer circuit 700 shares its video timing signals with a secondary video transfer circuit based on: receiving parallel video data at the third terminal or interface 703; obtaining video timing signals (e.g., VS, HS, and DE) from the parallel video data using the digital timing generator 430A; sharing the obtained video timing signals with a secondary video transfer circuit via the first terminal 756 of the digital circuitry 754, the fourth terminal of the analog circuitry 710, the third terminal 721C of the GPIO 720, the first terminal 721A of the GPIO 720, and the first terminal 701 of the video transfer circuit 700.

Other operations of the video transfer circuit 700, when operating as a primary video transfer circuit, may include: exchanging respective communication channel lock acknowledgements and/or respective DLL lock acknowledgments with a secondary video transfer circuit; providing parallel video data to a first video format controller such as the first video format controller 420A; providing parallel video data to a second video format controller such as the second video format controller 420B; providing local video timing signals to the digital timing generator 430A; delaying the local video timing signals and/or the local reset signal as needed for synchronization; providing the local reset signal to the reset synchronizer circuit 448A; using a divider such as the first and second dividers 460C or 460D to generate P_CLK based on UI_CLK and the local reset signal; providing P_CLK to the video format controller 420A; using a video format controller (e.g., video format controllers 420A and 420B), the first and second output interfaces 709A and 709B, and/or divider circuitry to generate an output video stream that is synchronized with the output video stream of a secondary video transfer circuit.

In some examples, the first video format controller 420A and the second video format controller 420B provide serialized video data and P_CLK to the first driver circuitry 456A and the second driver circuitry 456B. The first driver circuitry 456A and the second driver circuitry 456B buffer the serialized video data and P_CLK and provide output video streams responsive to the multi-chip synchronization operations as described herein. The output video streams from driver circuitry of the video transfer circuit 700 is conveyed via respective sets of terminals. Example terminals include the fourth terminal 704A, the fifth terminal 704B, the sixth terminal 704C, the seventh terminal 704D, the eighth terminal 704E, the ninth terminal 705, the tenth terminal 706A, the eleventh terminal 706B, the twelfth terminal 706C, the thirteenth terminal 706D, the fourteenth terminal 706E, and the fifteenth terminal 707. The output video streams are synchronized with each other and with the output video streams of the secondary de-serializer.

In some examples, the video transfer circuit 700 operates as a secondary video transfer circuit. In such examples, the video transfer circuit 700 operates to: receive synchronization signals (e.g., a reset signal and/or video timing signals such as VS, HS, and DE) from a primary video transfer circuit via the first terminal 701 and GPIOs such as the GPIO 720; delay the received synchronization signals (e.g., a received reset signal and/or received video timing signals such as VS, HS, and DE) using available programmable delay lines; perform local P_CLK calibration; and provide an output video stream responsive to the received reset signal, the received video timing signals, and the local P_CLK calibration. In some examples, the video transfer circuit 700 as a secondary video transfer circuit performs local P_CLK calibration in the same way as described for a primary video transfer circuit.

In some examples, the video transfer circuit 700 as a secondary video transfer circuit may also operate to: provide parallel video data to a first video format controller such as the first video format controller 420A; provide parallel video data to a second video format controller such as the second video format controller 420B; provide the received video timing signals to the digital timing generator 430A; provide the received reset signal to the reset synchronizer circuit 448A; delay the received video timing signals and/or the received reset signal as needed for synchronization; use a divider such as the first and second dividers 460C or 460D to generate P_CLK based on UI_CLK and the received reset signal; provide P_CLK to the video format controllers 420A and 420B; use a video format controller and divider circuitry, such as video format controllers 420A and 420B and the first and second output interfaces 709A and 709B, to generate an output video stream that is synchronized with the output video stream of a primary video transfer circuit.

With the video transfer circuit 700, the output video stream provided by the first output interface 709A and/or the second output interface 709B is synchronized with another video transfer circuit's output video stream responsive to shared video timing signals (VS, HS, and DE), the synchronized reset signal, and/or P_CLK calibration. The shared video timing signals are provided from or to the video timing signal interface 434A of the digital timing generator 430A responsive to a mode selection for the video transfer circuit 700. In some examples, the video transfer circuit 700 operates as a primary video transfer circuit and sends shared video timing signals to a second video transfer circuit via the video timing signal interface 434A. In other examples, the video transfer circuit 700 operates as a secondary video transfer circuit and receives shared video timing signals from a primary video transfer circuit via the via the video timing signal interface 434A.

Figure 8:
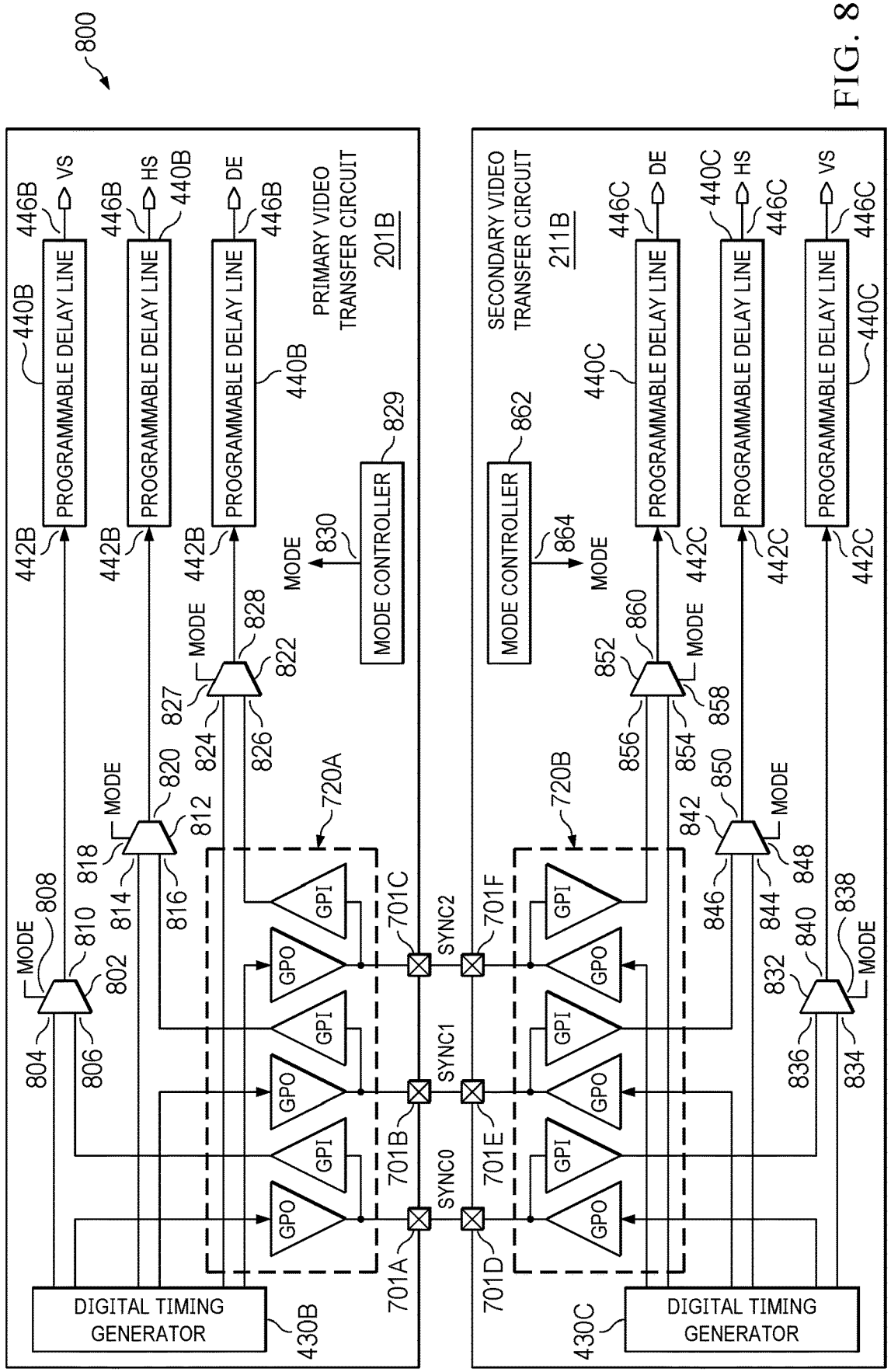
FIG. 8 is a diagram showing another example set of video transfer circuits.

FIG. 8 is a diagram showing another example set of video transfer circuits 800. As shown, the set of video transfer circuits 800 includes a primary video transfer circuit 201B and a secondary video transfer circuit 211B. The primary video transfer circuit 201B is an example of the first de-serializer 110 of FIG. 1, the first video transfer circuit 201 of FIG. 2, or the primary video transfer circuit 201A of FIG. 6. The secondary video transfer circuit 211B is an example of the second de-serializer 114 of FIG. 1, the second video transfer circuit 211 of FIG. 2, or the secondary video transfer circuit 211A of FIG. 6.

In the example of FIG. 8, the primary video transfer circuit 201B has a first terminal 701A, a second terminal 701B, and a third terminal 701C. The first terminal 701A, the second terminal 701B, and the third terminal 701C are examples of the first terminal 701 of FIG. 7, which was described as being repeated in some examples. The primary video transfer circuit 201B includes a digital timing generator 430B, a set of GPIOs 720A, a first multiplexer 802, a second multiplexer 812, a third multiplexer 822, a mode controller 829, and programmable delay lines 440B. The digital timing generator 430B is an example of the digital timing generator 430 of FIG. 4, or the digital timing generator 430A of FIG. 7. The set of GPIOs 720A is an example of the GPIO 720 of FIG. 7, which was described as being repeated in some examples. The set of GPIOs 720A includes general programmable output (GPO) buffers and general programmable input (GPI) buffers. Each of the GPO buffers and GPI buffers of the set of GPIOs 720A includes an input and an output.

The first multiplexer 802 includes a first input 804, a second input 806, a control input 808, and an output 810. The second multiplexer 812 includes a first input 814, a second input 816, a control input 818, and an output 820. The third multiplexer 822 includes a first input 824, a second input 826, a control input 827, and an output 828. The mode controller 829 includes a control output 830. The control output 830 provides a mode signal indicating a primary or secondary mode. Based on the mode signal, the first, second and third multiplexers 802, 812, and 822 pass local video timing signals or shared video timing signals at their respective outputs 810, 820, and 828.

The programmable delay lines 440B are examples of the second programmable delay line 440 in FIG. 4, or the second programmable delay line 440A of FIG. 7. Each of the programmable delay lines 440B includes a respective input 442B and a respective output 446B. In some examples, each of the programmable delay lines 440B includes a respective control input (not shown) such as the second input 444 in FIG. 4, or the second input 444A in FIG. 7

The digital timing generator 430B of the primary video transfer circuit 201B is coupled to the respective inputs of the GPO buffers of the set of GPIOs 720A. The respective outputs of the GPO buffers of the set of GPIOs 720A are coupled to the first terminal 701A, the second terminal 701B, and the third terminal 701C of the primary video transfer circuit 201B. The respective outputs of the GPO buffers of the set of GPIOs 720A are also coupled to respective inputs of the GPI buffers of the set of GPIOs 720A. The respective outputs of GPI buffers of the set of GPIOs 720A are coupled to respective second inputs 806, 816, and 826 of the first, second, and third multiplexers 802, 812, and 822. The digital timing generator 430B of the primary video transfer circuit 201B is also coupled to the respective first inputs 804, 814, and 824 of the first, second, and third multiplexers 802, 812, and 822. The outputs 810, 820, and 828 of the first, second, and third multiplexers 802, 812, and 822 are coupled to the respective inputs 442B of the programmable delay lines 440B. The outputs 446B of the programmable delay lines 440B provide delayed versions of VS, HS, and DE. In some examples, the delayed versions of VS, HS, and DE are provided to a digital timing generator such as the digital timing generator 430 of FIG. 4, or the digital timing generator 430A of FIG. 7B, and are used to account for video blanking intervals.

In the example of FIG. 8, the secondary video transfer circuit 211B has a first terminal 701D, a second terminal 701E, and a third terminal 701F. The first terminal 701D, the second terminal 701E, and the third terminal 701F are examples of the first terminal 701 of FIG. 7, which was described as being repeated in some examples. The secondary video transfer circuit 211B includes a digital timing generator 430C, a set of GPIOs 720B, a first multiplexer 832, a second multiplexer 842, a third multiplexer 852, a mode controller 862, and programmable delay lines 440C. The digital timing generator 430C is an example of the digital timing generator 430 of FIG. 4, or the digital timing generator 430A of FIG. 7. The set of GPIOs 720B is an example of the GPIO 720 of FIG. 7, which was described as being repeated in some examples. The set of GPIOs 720B includes general programmable GPO buffers and GPI buffers. Each of the GPO buffers and GPI buffers of the set of GPIOs 720B includes an input and an output.

The first multiplexer 832 includes a first input 834, a second input 836, a control input 838, and an output 840. The second multiplexer 842 includes a first input 844, a second input 846, a control input 848, and an output 850. The third multiplexer 852 includes a first input 854, a second input 856, a control input 858, and an output 860. The mode controller 862 includes a control output 864. The control output 864 provides a mode signal indicating a primary or secondary mode. Based on the mode signal, the first, second and third multiplexers 832, 842, and 852 pass local video timing signals or shared video timing signals at their respective outputs 840, 850, and 860.

The programmable delay lines 440C are examples of the second programmable delay line 440 in FIG. 4, or the second programmable delay line 440A of FIG. 7. Each of the programmable delay lines 440C includes a respective input 442C and a respective output 446C. In some examples, each of the programmable delay lines 440C includes a respective control input (not shown) such as the second input 444 in FIG. 4, or the second input 444A in FIG. 7

The digital timing generator 430C of the secondary video transfer circuit 211B is coupled to the respective inputs of the GPO buffers of the set of GPIOs 720B. The respective outputs of the GPO buffers of the set of GPIOs 720B are coupled to the first terminal 701D, the second terminal 701E, and the third terminal 701F of the secondary video transfer circuit 211B. The respective outputs of the GPO buffers of the set of GPIOs 720B are also coupled to respective inputs of the GPI buffers of the set of GPIOs 720B. The respective outputs of GPI buffers of the set of GPIOs 720B are coupled to respective second inputs 836, 846, and 846 of the first, second, and third multiplexers 832, 842, and 852. The digital timing generator 430C of the secondary video transfer circuit 211B is also coupled to the respective first inputs 834, 844, and 854 of the first, second, and third multiplexers 832, 842, and 852. The outputs 840, 850, and 860 of the first, second, and third multiplexers 832, 842, and 852 are coupled to the respective inputs 442C of the programmable delay lines 440C. The outputs 446C of the programmable delay lines 440C provide delayed versions of VS, HS, and DE. In some examples, the delayed versions of VS, HS, and DE are provided to a digital timing generator such as the digital timing generator 430 of FIG. 4, or the digital timing generator 430A of FIG. 7B, and are used to account for video blanking intervals.

In the example of FIG. 8, communication channels between the primary video transfer circuit 201B and the secondary video transfer circuit 211B that are available for synchronization operations are labeled "SYNC0", "SYNC1", "SYNC2". SYNC0 is between first terminal 701A of the primary video transfer circuit 201B and first terminal 701D of the secondary video transfer circuit 211B. SYNC1 is between the second terminal 701B of the primary video transfer circuit 201B and the second terminal 701E of the secondary video transfer circuit 211B. SYNC2 is between the third terminal 701C of the primary video transfer circuit 201B and the third terminal 701F of the secondary video transfer circuit 211B. To use these communication channels to send or receive synchronization signals as described herein, the related GPIOs may be selectively programmed for transmission or reception. Such programming is dynamic as needed to support transfer of lock acknowledgements, video timing signals, and/or a reset signal. Example synchronization operations of the primary video transfer circuit 201B and the secondary video transfer circuit 211B include: exchanging respective link lock acknowledgements; exchanging respective DLL lock acknowledgments; sharing video timing signals; sharing a reset signal; and performing respective P_CLK calibrations. In the example of FIG. 8, each of the primary video transfer circuit 201B and the secondary video transfer circuit 211B is able to use its own video timing signals (e.g., VS, HS, and DE) or the video timing signals of another video transfer circuit based on mode selection. In a primary video transfer circuit mode, a video transfer circuit shares its video timing signals with a secondary video transfer circuit and uses its own video transfer signals. In a secondary video transfer circuit mode, a video transfer circuit receives video timing signals from a primary video transfer circuit and uses the received video transfer signals. As needed, the video timing signals may be delayed by the primary video transfer circuit 201B and/or the secondary video transfer circuit 211B.

In some examples, one of two video transfers circuits is designated as the primary video transfer circuit while the other one is designated as the secondary video transfer circuit. In some examples, this designation is handled through register-programming. The synchronization between the video transfer circuits is based on three communication channels: SYNC0, SYNC1, and SYNC2. In some examples, both the primary and the secondary video transfer circuits may initially configure the GPIOs for SYNC0, SYNC1, and SYNC2 to receive incoming signals. In some examples, once a communication channel lock acknowledgement and a DLL lock acknowledgement are generated by the secondary video transfer circuit, the secondary video transfer circuit is configured to: program its respective SYNC2 GPIO to send outgoing signals; apply a High signal to the programmed SYNC1 GPIO; and wait to receive a High signal at its respective SYNC0 GPIO. Meanwhile, if the primary video transfer circuit generates a communication channel lock acknowledgement and DLL lock acknowledgement, the primary video transfer circuit is configured to: wait for a HIGH signal to the programmed SYNC1 GPIO. Once SYNC0 GPIO to send outgoing signals responsive to receiving the HIGH signal at its respective SYNC1 GPIO; and apply a HIGH signal to the programmed SYNC0 GPIO. Once the primary video transfer circuit senses its respective SYNC1 GPIO receives a HIGH signal, the primary video transfer circuit is configure to: program its respective SYNC0 GPIO to send outgoing signals; and apply a HIGH signal to the programmed SYNC0 GPIO.

At this point, both of the primary and secondary video transfer circuits are ready to enable a given communication interface (e.g., an OLDI interface). To do so, each of the primary and secondary video transfer circuits assert its respective enable signal to initiate the communication interface clock (e.g., an OLDI clock). As the handshaking involves some trace delay between the tow video transfer circuit ICs, a programmable delay may be used in each of the video transfer circuits to ensure the communication interface clocks are started simultaneously. In some examples, the primary video transfer circuit will have to compensate for the trace delay and hence would need more delay than the secondary video transfer circuit. Hence, the delay value of the primary video transfer circuit may be set to a higher value than the delay value of the secondary video transfer circuit. This way, divider-based clock signals (e.g., divide-by-7) of the two video transfer circuits are almost in-phase. Subsequently, the primary and second video transfer circuits program their respective GPIOs to reverse the direction of communication for SYNC1. In order to avoid any conflicts on the respective SYNC1 GPIOs, a configurable settling delay may be used in each of the video transfer circuits to wait before reversing the direction of their respective SYNC1 GPIOs.

Subsequently, SYNC0, SYNC1, and SYNC2 are configured as outputs for the primary video transfer circuit and as inputs for the secondary video transfer circuit. In some examples, the primary video transfer circuit then provides its video timing signals to secondary video transfer circuit via SYNC0, SYNC1, and SYNC2. For example, DE may be shared via SYNC0, VS may be shared via SYNC1, and HS may be shared via SYNC2. The secondary video transfer circuit uses these shared video timing signals instead of its local video timing signals. As needed, each of the shared video timing signals (e.g., VS, HS, and DE) and data can be delayed by a programmable number of clocks in both the primary and secondary video transfer circuits. In some examples, the delay used by the primary video transfer circuit for the video timing signals (e.g., VS, HS, and DE) and data is greater than the delay used by the secondary video transfer circuit to account for trace delay offset due to sharing the video timing signals from primary video transfer circuit to the secondary video transfer circuit.

In some examples, a video transfer circuit includes: a first communication interface (e.g., the input interface 708 in FIG. 7A); a second communication interface (e.g., the first terminal 701 in FIG. 7A or like terminals); a digital timing generator (e.g., the digital timing generator 430A in FIG. 7B). The digital timing generator has an input, an output, and a video timing signal interface. The input of the digital timing generator is coupled to the first communication interface. The video timing signal interface of the digital timing generator is coupled to the second communication interface. The digital timing generator is configured to: provide a first video timing signal to the second communication interface via the video timing signal interface responsive to a first mode selection; and receive a second video timing signal from the second communication interface via the video timing signal interface responsive to a second mode selection.

In some examples, the video transfer circuit also includes: a programmable delay line having a first input, a second input, and an output; and a multiplexer having a first input, a second input, a control input, and an output, the first input of the multiplexer coupled to the video timing signal interface of the digital timing generator, the second input of the multiplexer coupled to the second communication interface, and the multiplexer configured to receive the first video timing signal at its first input and the second video timing signal at its second input; and a controller having a control output coupled to the control input of the multiplexer, the controller configured to vary a mode signal at the control output responsive to the video transfer circuit being used as a primary video transfer circuit or a secondary video transfer circuit.

In some examples, the digital timing generator is configured to: provide a first set of video timing signals to the second communication interface via the video timing signal interface responsive to a first mode selection; and receive a second set of video timing signals from the second communication interface via the video timing signal interface responsive to a second mode selection. In such examples, the video transfer circuit also includes: a set of multiplexers, the set of multiplexers configured to select the first set of video timing signals or the second set of video timing signals responsive to a mode signal; and a set of programmable delay lines configured to apply a delay to the first set of video timing signals or the second set of video timing signals selected by the set of multiplexers.

In some examples, the video transfer circuit also includes: a divider having a first input, a second input, and an output; and a reset synchronizer having a first input, a second input, and an output, the output of the reset synchronizer coupled to the second input of the divider. The reset synchronizer is configured to: receive a shared reset signal at the second input responsive to the first mode selection; receive a local reset signal responsive at the second input responsive to the second mode selection; and provide a synchronized reset signal at its output responsive to the shared reset signal or the local reset signal.

In some examples, the video transfer circuit also includes a programmable delay line configured to delay the shared reset signal or the local reset signal received at the second input of the reset synchronizer. In some examples, the video transfer circuit also includes: a clock input configured to receive a reference clock; a programmable delay line having a first input, a second input, and an output, the first input coupled to the clock input; and PLL having an input and an output. The input of the PLL is coupled to the output of the programmable delay line. The output of the PLL is coupled to the first input of the reset synchronizer. The reset synchronizer is configured to provide the synchronized reset signal at its output responsive to a local clock at the output of the PLL and the shared reset signal or the local reset signal. In some examples, the video transfer circuit also includes a DLL having an input and an output. The input of the DLL is coupled to the output of the PLL. In some examples, the video transfer circuit also includes an LDO having an input and an output. The input of the LDO is coupled to the output of the DLL. The output of the LDO is coupled to the second input of the programmable delay line. In some examples, the programmable delay line has a third input, and the programmable delay line is configured to adjust a delay applied to the reference clock responsive to a first control signal received at its second input and a second control signal received at its third input.

In some examples, the second communication interface includes a set of GPIOs, and the video transfer circuit includes multi-chip synchronization circuitry configured to: output a first reset signal and a first set of video timing signals including the first video timing signal via the set of GPIOs to another video transfer circuit responsive to the first mode selection; and receive a second reset signal and a second set of video timing signals from the other video transfer circuit responsive to the second mode.

In some examples, a de-serializer chip incudes: a first communication interface; a second communication interface; a third communication interface; and control circuitry coupled to the first, second, and third communication interfaces. The control circuitry is configured to: receive a mode selection; obtain an input video stream via the first communication interface; perform multi-chip synchronization operations with another de-serializer chip via the second communication interface and based on the mode selection; and provide a first output video stream via the third communication interface responsive to the input video stream and the multi-chip synchronization operations, the first output video stream synchronized with a second output video stream provided by the other de-serializer chip.

In some examples, the multi-chip synchronization operations include sending video timing signals obtained from the input video stream to the other de-serializer chip via the second communication interface responsive to the mode selection indicating a primary de-serializer mode. In some examples, the multi-chip synchronization operations include: obtaining video timing signals from the other de-serializer chip via the second communication interface responsive to the mode selection indicating a secondary de-serializer mode; and using the video timing signals to provide the first output video stream. In some examples, the multi-chip synchronization operations include: sending a reset signal to the other de-serializer chip via the second communication interface responsive to the mode selection indicating a primary de-serializer mode; delaying the reset signal locally; and using the delayed reset signal to provide the first output video stream. In some examples, the multi-chip synchronization operations include: receiving a reset signal from the other de-serializer chip via the second communication interface responsive to the mode selection indicating a secondary de-serializer mode; and using the received reset signal to provide the first output video stream. In some examples, the multi-chip synchronization operations include: adjusting latency of generating a pixel clock signal from a reference clock signal based on a calibration; and providing the first output video stream based on the pixel clock signal. In some examples, the first communication interface is an FPD-Link III interface, the second communication interface is a GPIO interface, and the third communication interface is an FPD-Link interface.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A video transfer circuit comprising:
   a first communication interface;
   a second communication interface;
   a digital timing generator having an input, an output, and a video timing signal interface, the input coupled to the first communication interface, the video timing signal interface coupled to the second communication interface, and the digital timing generator configured to:
      provide a first video timing signal to the second communication interface via the video timing signal interface responsive to a first mode selection; and
      receive a second video timing signal from the second communication interface via the video timing signal interface responsive to a second mode selection;
   a divider having a first input, a second input, and an output; and
   a reset synchronizer having a first input, a second input, and an output, the output of the reset synchronizer coupled to the second input of the divider, and reset synchronizer configured to:
      receive a shared reset signal at the second input of the reset synchronizer responsive to the first mode selection;
      receive a local reset signal at the second input responsive to the second mode selection of the reset synchronizer; and
      provide a synchronized reset signal at its output responsive to the shared reset signal or the local reset signal.

2. The video transfer circuit of claim 1, further comprising:
   a programmable delay line having a first input, a second input, and an output;
   a multiplexer having a first input, a second input, a control input, and an output, the first input of the multiplexer coupled to the video timing signal interface of the digital timing generator, the second input of the multiplexer coupled to the second communication interface, and the multiplexer configured to receive the first video timing signal at its first input and the second video timing signal at its second input; and
   a controller having a control output coupled to the control input of the multiplexer, the controller configured to vary a mode signal at the control output responsive to the video transfer circuit being used as a primary video transfer circuit or a secondary video transfer circuit.

3. The video transfer circuit of claim 1, wherein the digital timing generator is configured to:
   provide a first set of video timing signals to the second communication interface via the video timing signal interface responsive to a first mode selection; and
   receive a second set of video timing signals from the second communication interface via the video timing signal interface responsive to a second mode selection, and
   the video transfer circuit further comprises:
   a set of multiplexers, the set of multiplexers configured to select the first set of video timing signals or the second set of video timing signals responsive to a mode signal; and a set of programmable delay lines configured to apply a delay to the first set of video timing signals or the second set of video timing signals selected by the set of multiplexers.

4. The video transfer circuit of claim 1, further comprising a programmable delay line configured to delay the shared reset signal or the local reset signal received at the second input of the reset synchronizer.

5. The video transfer circuit of claim 1, wherein the video transfer circuit further comprises:
a clock input configured to receive a reference clock;
a programmable delay line having a first input, a second input, and an output, the first input coupled to the clock input;
a phase-locked loop (PLL) having an input and an output, the input of the PLL coupled to the output of the programmable delay line, the output of the PLL coupled to the first input of the reset synchronizer, and the reset synchronizer configured to provide the synchronized reset signal at its output responsive to a local clock at the output of the PLL and the shared reset signal or the local reset signal;
a delay-locked loop (DLL) having an input and an output, the input of the DLL coupled to the output of the PLL; and
a low-dropout regulator (LDO) having an input and an output, the input of the LDO coupled to the output of the DLL, the output of the LDO coupled to the second input of the programmable delay line.

6. The video transfer circuit of claim 5, wherein the programmable delay line has a third input, and the programmable delay line is configured to adjust a delay applied to the reference clock responsive to a first control signal received at its second input and a second control signal received at its third input.

7. The video transfer circuit of claim 1, wherein the second communication interface includes a set of general programmable input/outputs (GPIOs), and the video transfer circuit includes multi-chip synchronization circuitry configured to:
output a first reset signal and a first set of video timing signals including the first video timing signal via the set of GPIOs to another video transfer circuit responsive to the first mode selection; and
receive a second reset signal and a second set of video timing signals from the other video transfer circuit responsive to the second mode.

8. A de-serializer chip comprising:
a first communication interface;
a second communication interface;
a third communication interface; and
control circuitry coupled to the first, second, and third communication interfaces, the control circuitry is configured to:
receive a mode selection;
obtain an input video stream via the first communication interface;
perform multi-chip synchronization operations with another de-serializer chip via the second communication interface and based on the mode selection, including:
programming general programmable input/outputs (GPIOs) related to the second communication interface to send and receive a communication link lock acknowledgement and a delay-locked loop (DLL) lock acknowledgment; and
after sending and receiving the communication link lock acknowledgement and a DLL lock acknowledgment, re-programming one of the programmed GPIOs; and
provide a first output video stream via the third communication interface responsive to the input video stream and the multi-chip synchronization operations, the first output video stream synchronized with a second output video stream provided by the other de-serializer chip.

9. The de-serializer chip of claim 8, wherein the multi-chip synchronization operations include sending video timing signals obtained from the input video stream to the other de-serializer chip via the second communication interface responsive to the mode selection indicating a primary de-serializer mode.

10. The de-serializer chip of claim 8, wherein the multi-chip synchronization operations include:
obtaining video timing signals from the other de-serializer chip via the second communication interface responsive to the mode selection indicating a secondary de-serializer mode; and
using the video timing signals to provide the first output video stream.

11. The de-serializer chip of claim 10, wherein the multi-chip synchronization operations include:
obtaining the video timing signals via GPIOs related to the second communication interface including the re-programmed GPIO.

12. The de-serializer chip of claim 8, wherein the multi-chip synchronization operations include:
sending a reset signal to the other de-serializer chip via the second communication interface responsive to the mode selection indicating a primary de-serializer mode;
delaying the reset signal locally; and
using the delayed reset signal to provide the first output video stream.

13. The de-serializer chip of claim 8, wherein the multi-chip synchronization operations include:
receiving a reset signal from the other de-serializer chip via the second communication interface responsive to the mode selection indicating a secondary de-serializer mode; and
using the received reset signal to provide the first output video stream.

14. The de-serializer chip of claim 8, wherein the multi-chip synchronization operations include:
adjusting latency of generating a pixel clock signal from a reference clock signal based on a calibration; and
providing the first output video stream based on the pixel clock signal.

15. The de-serializer chip of claim 8, wherein the first communication interface is a flat-panel display (FPD)-Link III interface, the second communication interface is a general programmable input/output (GPIO) interface, and the third communication interface is an FPD-Link interface.

16. A video transfer circuit method comprising:
receiving a mode selection;
obtaining an input video stream;
performing multi-chip synchronization operations with another video transfer circuit based on the mode selection, including:
sending or receiving shared video timing signals responsive to the mode selection;
programming general programmable input/outputs (GPIOs) to send and receive a communication link lock acknowledgement and a delay-locked loop (DLL) lock acknowledgment;
after sending and receiving the communication link lock acknowledgement and the DLL lock acknowledgment, re-programming one of the programmed GPIOs; and
sharing the video timing signals via GPIOs including the re-programmed GPIO; and
providing a first output video stream responsive to the input video stream and the multi-chip synchronization operations, the first output video stream synchronized with a second output video stream provided by the other video transfer circuit.

17. The method of claim 16, wherein performing the multi-chip synchronization operations includes:
sending or receiving a reset signal responsive to the mode selection;
delaying the reset signal; and
using the delayed reset signal to provide the first output video stream.

* * * * *